Figure 1:
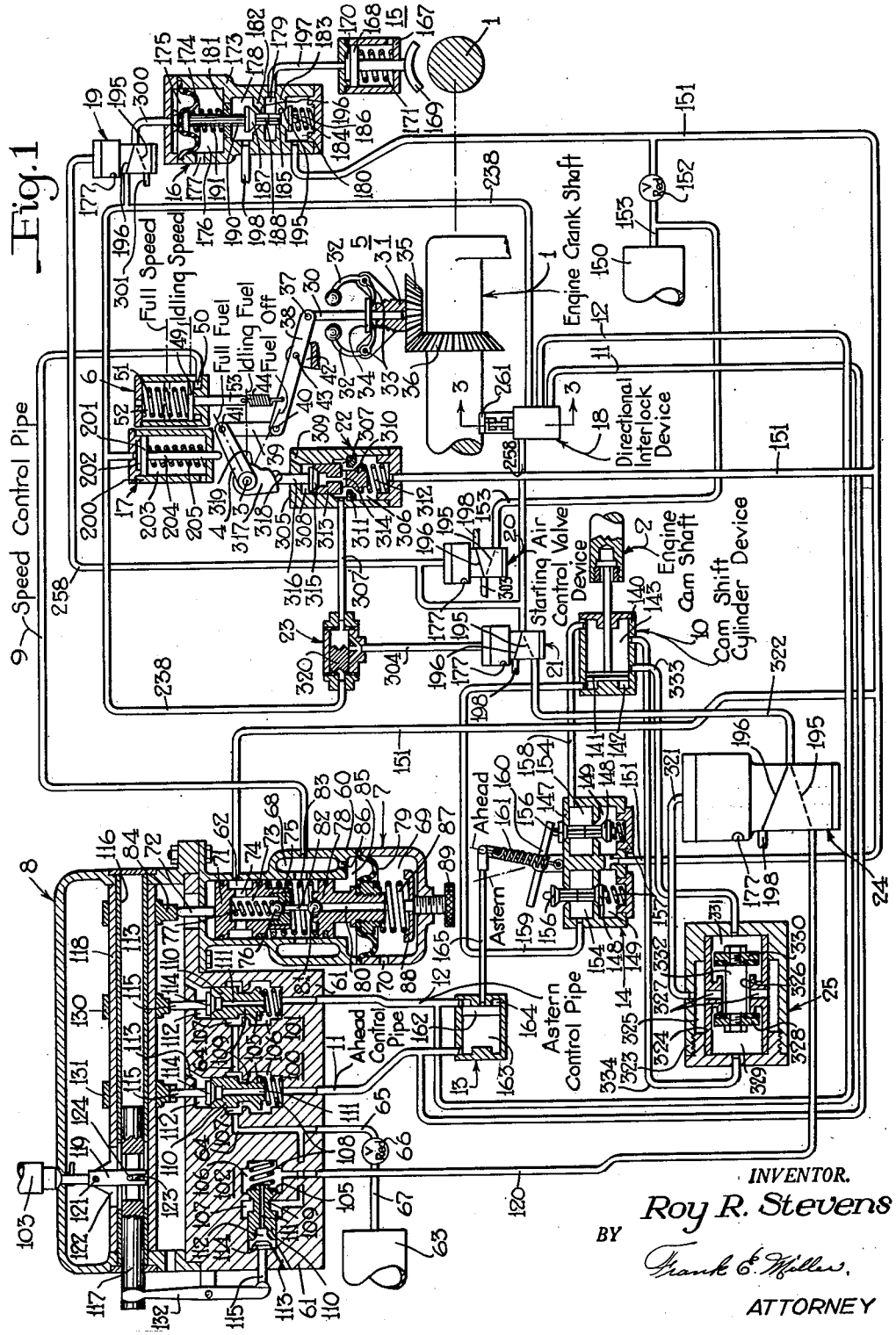

Dec. 25, 1951   R. R. STEVENS   2,580,369
ENGINE CONTROL APPARATUS FOR STARTING,
STOPPING, RUNNING, AND REVERSING
Filed Jan. 29, 1949   3 Sheets-Sheet 1

INVENTOR.
Roy R. Stevens
BY
Frank E. Miller
ATTORNEY

Dec. 25, 1951   R. R. STEVENS   2,580,369
ENGINE CONTROL APPARATUS FOR STARTING,
STOPPING, RUNNING, AND REVERSING
Filed Jan. 29, 1949   3 Sheets-Sheet 2
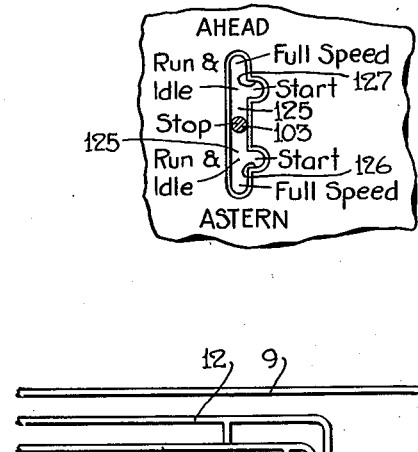
Fig. 2
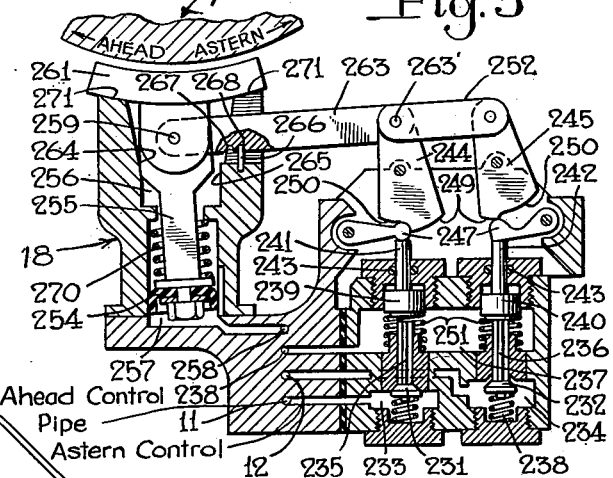
Fig. 3
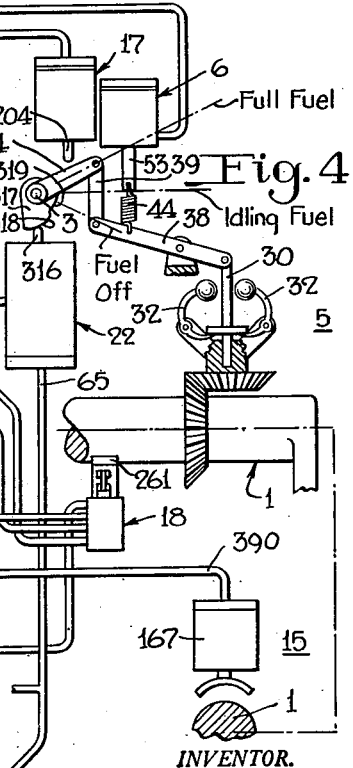
Fig. 4
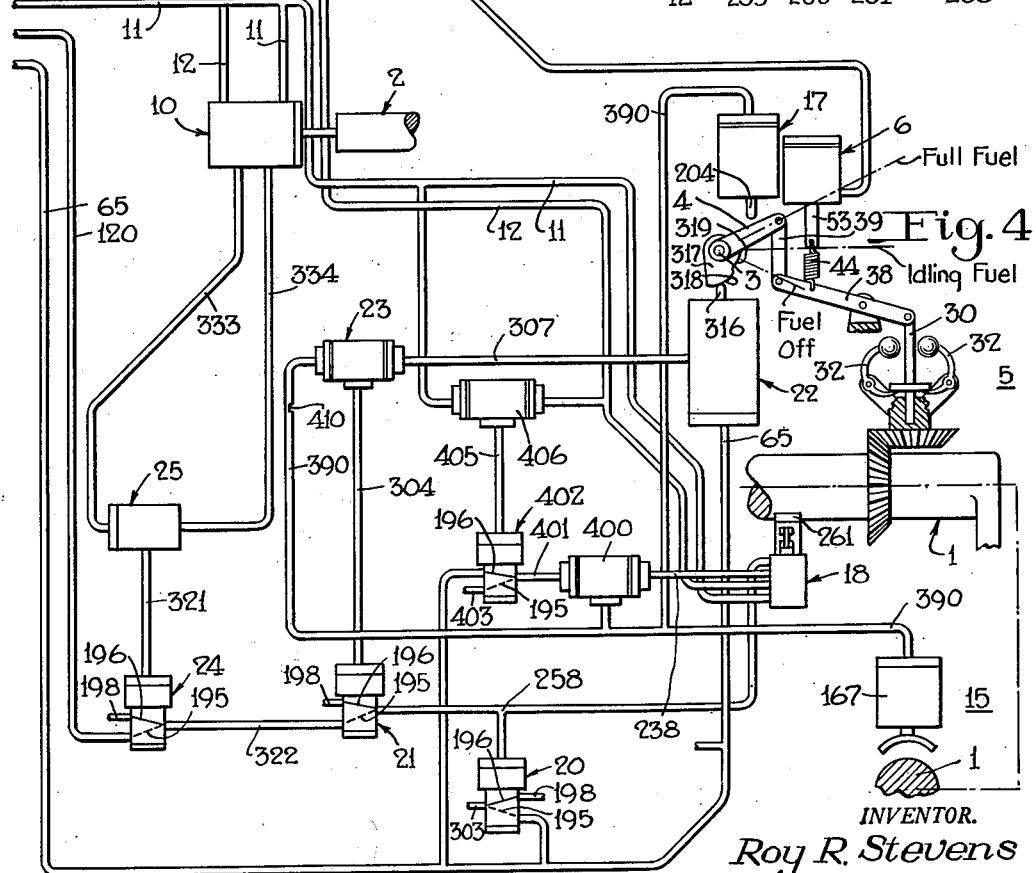
INVENTOR.
Roy R. Stevens
BY
Frank E. Miller
ATTORNEY Dec. 25, 1951      R. R. STEVENS      2,580,369
ENGINE CONTROL APPARATUS FOR STARTING,
STOPPING, RUNNING, AND REVERSING
Filed Jan. 29, 1949      3 Sheets-Sheet 3
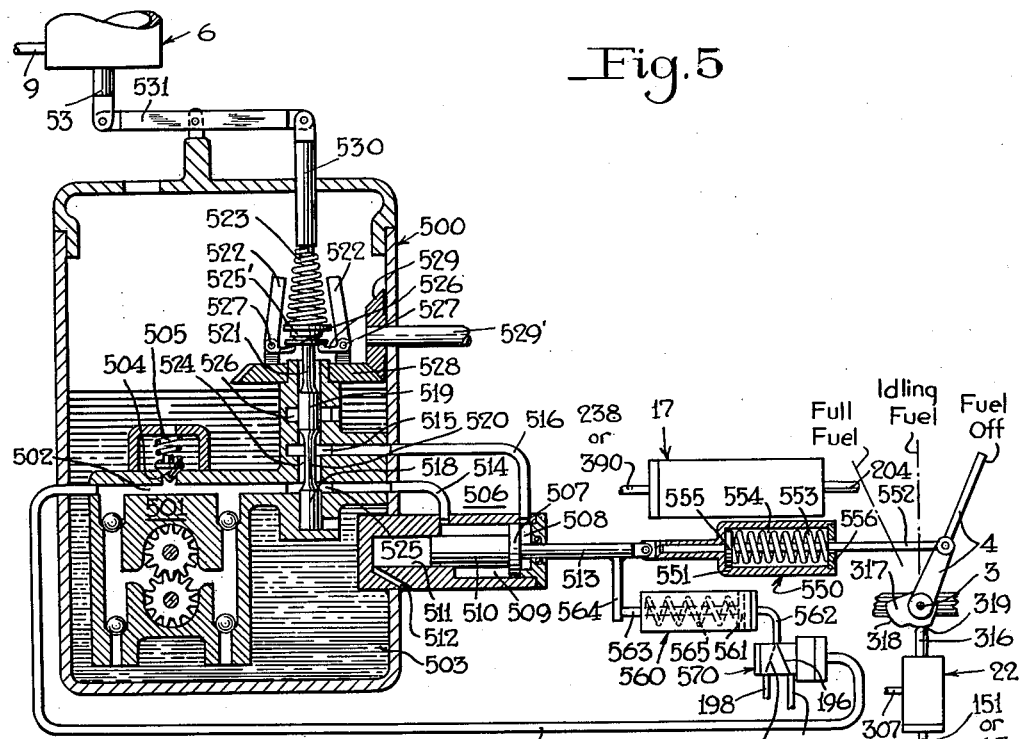
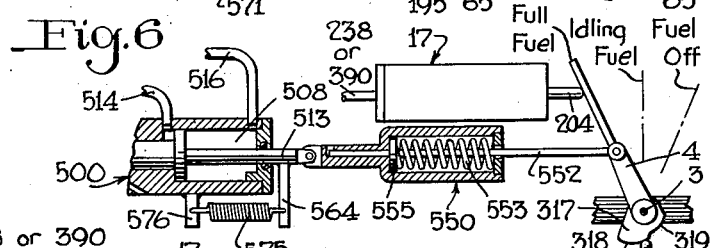
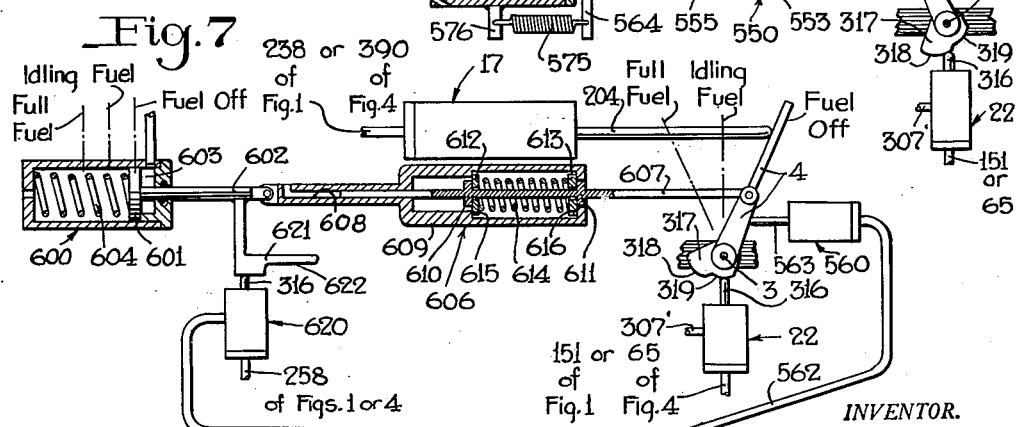
INVENTOR.
Roy R. Stevens
BY
Frank E. Miller
ATTORNEY Patented Dec. 25, 1951

2,580,369

UNITED STATES PATENT OFFICE 2,580,369

ENGINE CONTROL APPARATUS FOR STARTING, STOPPING, RUNNING, AND REVERSING

Roy R. Stevens, Forest Hills, Pa., assignor to Westinghouse Air Brake Company, a corporation of Pennsylvania Application January 29, 1949, Serial No. 73,556

18 Claims. (Cl. 192—3)

This invention relates to control apparatus and more particularly to the fluid pressure type for controlling a plurality of different operations in a desired sequence, such as is required in controlling a reversible diesel engine.

The principal object of the invention is the provision of an improved fluid pressure control apparatus which is operable in response to manual adjustments of a single operator's control lever to effect, automatically, a plurality of different operations in a desired sequence, such for example, as are incident to effecting the starting, stopping, reversing, etc., of a reversible diesel engine.

According to a main feature of the invention, the apparatus comprises means for effecting automatic cut-off of supply of starting air to the engine when the engine begins to run on fuel, thereby conserving a considerable amount of starting air and therefore the expense of compressing same.

Other objects and advantages will be apparent from the following more detailed description of the invention.

In the accompanying drawings; Fig. 1 is a diagrammatic view, partly in section and partly in outline, of a fluid pressure control apparatus embodying the invention; Fig. 2 is a plan, fragmentary view of an operator's control device comprised in the apparatus shown in Fig. 1; Fig. 3 is a cross-sectional detailed view of a directional interlock device shown in outline in the structure shown in Fig. 1; Fig. 4 is a diagrammatic view, substantially in outline, of a second fluid pressure control apparatus embodying the invention; and Figs. 5, 6 and 7 are diagrammatic views of alternate arrangements whereby a hydraulic speed governor device may be employed in lieu of a speed governor device of the type comprised in the apparatus as shown in Figs. 1 and 4.

Description—Fig. 1

The reversible engine (not shown) may comprise the usual crank shaft 1, only a portion of which is shown in the drawing, and a cam shaft 2, a portion of which is shown also in the drawing. The crank shaft 1 may be operably connected to the pistons (not shown) of the engine and operatively connected to a propeller or propellers (not shown) of a ship, for example. The cam shaft 2 is adapted to be driven in proper phase with the crank shaft 1 in the usual manner for operating conventional engine valve mechanism (not shown) to permit the engine to be started by compressed air for operation in either direction of rotation, to, for instance, drive a ship ahead or astern. The cam shaft 2 may have the usual forward cams (not shown) to provide for operation in one or an ahead direction and may have the usual reverse cams (not shown) to provide for operation in the reverse or astern direction. In the well-known manner, the cam shaft 2 may be shiftable axially in one direction to a position for rendering the forward cams effective to operate the engine's valve or timing gear, and in the opposite direction to another position for rendering the reverse cams effective to operate said gear.

The reversible internal combustion engine may further comprise a fuel control shaft 3 operatively connected to fuel control valve means (not shown) for regulating the quantity of fuel supplied to the engine cylinders by way of fuel injection nozzles or the like (not shown). The control shaft 3 is secured for turning movement by a fuel control lever 4 which may be disposed outside the engine. The lever 4 is adapted to be moved to a "Fuel off" position, indicated by a dot-and-dash line so titled in the drawing, in which position the fuel control valve means is so conditioned as to cut off supply of fuel to the engine's cylinders. By counter-clockwise turning movement of lever 4 from its "Fuel off" position, as viewed in the drawing, toward and to a "Full fuel" position, in which position it is shown in the drawing, fuel supply to the engine cylinders may be increased to a maximum amount corresponding to said "Full fuel" position. An "Idling fuel" position, intermediate "Full fuel" position and "Fuel off" position, may be assumed by lever 4 to effect delivery to the engine's cylinders of an amount of fuel sufficient to sustain operation of the engine at an idling speed.

The control apparatus embodying the invention may comprise a speed governor device 5 operable in the usual manner through a driven connection with the crank shaft 1 to control the amount of fuel supplied to the engine and thereby power or speed of said engine through positioning of the fuel control lever 4 in accord with the speed setting of said governor device. An actuator in the form of speed control cylinder device 6 is arranged to control the speed setting of the governor device 5 according to the pressure of fluid supplied to said device 6. In a well-known manner, the pressure of fluid in the speed control cylinder device 6 may be varied from a station remote from the engine, such as in the pilot house of a ship by means such as a self-lapping speed control valve device 7 comprised in an operator's control device 8 located at such a station. A speed control pipe 9 is provided to convey fluid under pressure between the speed control valve device 7 in the pilot house and the speed control cylinder device 6 at the engine.

To condition the engine for operation in one direction or the other, the control apparatus is provided with the usual cam shift cylinder device 10 mounted on or with the engine and operatively connected to the cam shaft 2 for shifting position of same according as whether it is desired to operate the engine in one direction of rotation for propelling the ship ahead or to operate the engine in the opposite direction of rotation for propelling the ship astern. The cam shift cylinder 10 is arranged to be controlled by the operator's control device 8 in the pilot house according to pressure conditions established by said device 8 in ahead and astern control pipes 11 and 12 which extend between said device 8 in the pilot house to the engine remote from said device 8.

According to a feature of the invention embodied in the structure shown in Fig. 1, means in the form of a maintaining cylinder device 13 and a maintaining valve device 14 are provided at the engine for assuring that the cam shift cylinder device 10 will be maintained in a previously assumed position calling for operation of the engine in a corresponding direction even though pressure of fluid in the control pipe 11 or 12 should fail accidentally, as will be pointed out in detail hereinafter.

A fluid pressure operated brake 15 is provided in the control apparatus for applying a restraining force to oppose rotation of the crank shaft for decelerating the engine. A relay valve device 16 is provided for controlling supply and release of fluid under pressure directly to and from the brake 15.

A fluid pressure operated fuel cut-off cylinder device 17 is provided for effecting cut-off of fuel to the engine when stopping or reversing same. A directional interlock device 18 is adapted and arranged to control operation of the brake 15, by way of a brake interlock device 19, and operation of the fuel cut-off cylinder device 17, as will be described in detail hereinafter, according to direction of rotation of the engine crank shaft 1.

A starting air control valve device 20 is provided for controlling supply of starting air to the engine. A starting interlock device 21 is arranged to control operation of the starting air control valve device 20, the brake interlock device 19, and the directional interlock device 18. The starting interlock device 21 is in turn controlled by the directional interlock device 18 and a starting air cut-off valve device 22 by way of a double check valve device 23. As will be pointed out hereinafter, according to one of the features of the invention, the valve device 22 is arranged to be operable to effect cutting off of the starting air to the engine after same starts running on fuel.

A cam shift interlock device 24 controls fluid under pressure supply to the starting interlock device 21. The cam shift interlock device 24 is arranged to be controlled by the cam shift cylinder device 10 by way of an inverse double check valve device 25 in such a manner that in reversing direction of operation of the engine, the brake 15 will be released and starting air supplied to the engine automatically at the time the cam shift cylinder device 10 has completed shift of the cam shaft 2 to condition the engine for operation in a reverse direction, as will be described in detail hereinafter.

In more complete detail, the speed governor device 5 may, for the purpose of illustration, comprise a head 31 in which a plunger 30 is slidably mounted. Two centrifugal governor flyball arms 32 are pivoted on pins 33 in the head 31 and are operatively connected to a collar 34 secured to the plunger 30. The head 31 is operably connected by gears 35, 36 to any suitable rotary part of the engine, such as the crank shaft 1. The plunger 30 is pivotally connected at 37 to one end of a lever 38, the opposite end of which lever is operatively connected through a link 39 and pin connections 40, 41, to the fuel control lever 4 on the engine. Intermediate its opposite ends the lever 38 is pivotally connected to a fixed element 42 by means of a pin 43. A speed control spring 44, in the form of a tension spring, is connected to lever 38 in such a manner as will bias the fuel control lever 4 toward its "Full fuel" position and the plunger 30 downwardly, as viewed in the drawing. Initial tension of the spring 44 will determine the speed setting of the governor device 5 and such tension or setting is arranged to be controlled by the cylinder device 6, as will be described herein subsequently.

In operation of the governor device 5, if the engine is idle and the shaft 1 yet to turn, there will be no force acting through the plunger 30 on lever 38 at one side of pin 43 tending to oppose action of the tension spring 44 on said lever at the other side of said pin, so that the spring 44 will maintain the lever 38 so positioned as to hold the fuel control lever 4 in its "Full fuel" position, in which position it is shown in the drawing. As will hereinafter become obvious, the speed control cylinder device 6 is so positioned, when pressure of fluid in the pipe 9 is at atmospheric as determined by position of the speed control device 7, as to call for minimum initial tension of the spring 44 acting on lever 38, corresponding to an idling speed setting of the governor device 5, tending to hold the fuel control lever 4 in its "Full fuel" position. It should be pointed out, however, that this minimum tension of spring 44 is sufficiently great as to maintain the fuel control shaft 4 in its "Full fuel" position even though the engine may be turning over on starting air. While the engine is turning over on starting air, the crank shaft 1 will turn, as will the governor head 31 and arms 32, and the arms 32 will cause a force to be exerted upwardly on plunger 30 through the collar 34 tending to effect rocking of lever 38 counter-clockwise about pin 43, but such force of rod 30 at this time, that is while the engine is being turned over on starting air, will not be sufficient to effect such rocking of the lever 38 and the fuel control lever 4 will remain in its "Full fuel" position. With the spring 44 thus set for minimum tension corresponding to an idling speed of the engine, when the engine fires and starts to run on fuel supplied thereto in a maximum amount in accord with the "Full fuel" position of the fuel control lever 4, the engine speed will tend to increase rapidly over its previous speed when being turned over on starting air. As the engine speed increases above starting speed, and the crank shaft 1 and governor head 31 therefore increasing in rotational speed, the arms 32 rotating with the head 31 will cause a force, through centrifugal action, to be exerted on plunger 30 and thereby lever 38 which will overcome action of spring 44 and move the fuel control shaft 4 out of its "Full fuel" position in the direction of "Idling fuel" position, tending to reduce the amount of fuel to the engine and thereby its speed, which position said shaft 4 will assume when a balance is attained between the effect of spring 44 acting on lever 38 at one side of pin 43 and the effect of plunger 30 acting on the other side of said pin on lever 38. Once such balance has thus been established, so long as the tension of spring 44 remains set for minimum initial tension, as above described, the engine will continue to run at its idling speed in accord with setting of the fuel control lever 4 in its "Idling fuel" position, for a given load condition on crank shaft 1. By subsequent increase in tension of spring 44 through operation of speed control cylinder device 6, the speed setting of governor device 5 may be increased said spring will then cause movement of fuel control lever 4 toward the "Full fuel" position and thereby increase the speed of the engine until a balance between action of said spring on lever 38 again reaches a balance with the action of plunger 30 on said lever 38. When speed control cylinder device 6 causes a maximum initial tension of the spring 44, the governor device 5 will effect positioning of the fuel control lever 4 in the direction of "Full fuel" position to increase the speed of the engine until a balance in lever 38 is again attained between the action of spring 44 and of the rod 30. In any speed setting of the governor device 5, as determined by tension of the spring 44, said device 5 will function to maintain such speed of operation of the engine. If, while the engine is operating at a certain speed, a change in load on the engine occurs, such as an increase in load for example, speed of rotation of crank shaft 1 and governor head 31 will tend to decrease, thereby tending to reduce the force exerted through centrifugal action by plunger 30 on lever 38 and allowing spring 44 to move lever 4 in the direction of "Full fuel" position to supply more fuel to the engine to maintain its speed as determined by the speed setting of the governor device under the increased load. Conversely, for example, the governor device 5 will effect adjustment of the position of the fuel control lever 4 to decrease supply of fuel to the engine for maintaining a speed thereof in accord with the speed setting of said governor device in event that load on the engine should be reduced during operation of said engine.

The speed control cylinder device 6, for sake of illustration, may comprise a casing having a piston 49 slidably disposed therein and subject opposingly to pressure of fluid in a pressure chamber 50 open to pipe 9 at its one side and to force of a compression spring 51 in a chamber 52 open to atmosphere on its opposite side. The piston 49 is operatively connected to one end of the tension spring 44 through a piston rod 53. Spring 51 urges the piston 49 toward a position indicated in the drawing by a dot-and-dash line titled "Idling speed" position in which the initial tension of spring 44 is at its minimum value calling for idling speed of the governor device 5 as aforedescribed. By an increase in pressure in chamber 50 up to a maximum value, the piston may be caused to assume positions in the direction of chamber 52 toward and to a limit position indicated in the drawing by a dot-and-dash line titled "Full speed," and thereby effect increase in the initial tension of the spring 44 up to a maximum for increasing the speed setting of the governor device 5, as will be appreciated from previous description. By subsequent controlled reduction in pressure of fluid in chamber 50, through release of fluid under pressure via pipe 9, the initial tension of spring 44 may be reduced as piston 49 returns toward and to its "Idling speed" position. It will be appreciated that any position of piston 49 between "Idling speed" and "Full speed" may be effected in accordance with pressure of fluid in chamber 50.

It will be seen, therefore, that the speed setting of the governor device 5, hence speed of operation of the engine while running on fuel, will be in accord with the pressure of fluid in the speed control pipe 9 connected to the chamber 50 in the speed control cylinder device 6; a minimum pressure such as atmospheric pressure, for example, will correspond to an idling speed setting of the governor device 5 and a maximum pressure of eighty pounds, for example, may correspond to a full speed setting of said governor device.

The self-lapping valve device 7 associated with the operator's control device 8 for effecting variations in pressure of fluid in the speed control pipe 9 may comprise a casing 60 secured to a body 61 of device 8, having a fluid pressure supply chamber 62 connected to a source of fluid under pressure such as a reservoir 150 by way of a pipe 153, a reducing valve 152, and a pipe 151. The casing 60 may also have a delivery chamber 68 connected to the speed control pipe 9, and an exhaust chamber 69 open to atmosphere by way of a port 70. A supply valve seat element 71, attached to an operating stem 72, is adapted and arranged for reciprocable movement within the casing 60. Element 71 is hollow intermediate its ends, and its interior forms a chamber 73 opening to the supply chamber 62 by way of ports 74. The element 71 is also adapted to open its chamber 73, and thereby supply chamber 62, to the delivery chamber 68 by way of a central opening 75 in said element. A supply valve 76, in the form of a metal ball, is disposed in the chamber 73 to cooperate with a seat formed in element 71 encircling opening 75 for controlling communication between said chamber 73, hence supply chamber 62, and the delivery chamber 68 by way of opening 75. A bias spring 77 disposed in chamber 73 is arranged to urge the supply valve 76 toward a seated position closing the passage 75 to said chamber 73. An exhaust valve seat element 78, secured for reciprocable movement with deflection of a diaphragm 79, is adapted to open at its one end to the delivery chamber 68. Valve seat element 78 extends through the diaphragm 79 and into the exhaust chamber 69. A central opening 80 extends from end to end of the seat element 78 to form a communication for conveying fluid under pressure from the delivery chamber 68 to the exhaust chamber 69. An exhaust valve 81, similar to supply valve 76 and attached thereto by means of a rod 82, is disposed in chamber 68 to cooperate with a seat formed in element 78 encircling one end of opening 80 for closing said chamber 68 from said opening 80 and thereby from the exhaust chamber 69. A bias spring 83 is disposed in chamber 68 and interposed between elements 71, 78 for urging stem 72 outwardly through the casing for engagement with a cam 84. The diaphragm 79 is subject opposingly to pressure of fluid in a diaphragm chamber 85 on its one side, which chamber is constantly open to delivery chamber 68 via a port 86, and to force of a control spring 87 disposed in exhaust chamber 69 on its opposite side. Control spring 87 determines the degree of deflection of diaphragm 79 for any given pressure of delivery fluid in chamber 85. Initial compression of the control spring 87 may be varied by adjustment of position of a spring seat element 88 through turning of a knurled handle 89 disposed outside the casing.

In operation of the self-lapping speed control valve device 7, when stem 72 is moved inwardly of the casing 60 a certain distance, the attached seat element 71 is moved downwardly, as viewed in the drawing, while the supply valve seat formed in the end of element 71 is moved away from the supply valve 76. At this time, the supply valve 76 does not move with element 71 due to seated engagement of the exhaust valve 81 on element 78 which is yet to move. After the supply valve seat in element 71 thus moves away from the supply valve 76, supply chamber 62 is opened to delivery chamber 68 and pipe 9, by way of the ports 74, chamber 73 and opening 75 in element 71. Fluid under pressure from pipe 151 connected to supply chamber 62 will then flow to the pipe 9 and to the chamber 50 in speed control cylinder device 6, where the pressure of fluid thus will be caused to increase for increasing the speed setting of the speed governor device 5, as will be appreciated from previous description. Again in the self-lapping valve device 7, a corresponding increase in pressure of fluid will occur in diaphragm chamber 85 by flow of fluid under pressure from delivery chamber 68 through the opening 86, which increase in pressure in the diaphragm chamber 85 will cause deflection of the diaphragm 79 against action of the control spring 87 in the direction of chamber 69. This deflection of the diaphragm 79 will carry the exhaust valve seat element 78 with it. Bias spring 77 will cause the supply valve 76 and exhaust valve 81 to follow the movement of seat element 78, while said exhaust valve remains seated on element 78, maintaining the respective end of opening 80 therein closed until said supply valve reseats on its seat in element 71, at which time further movement ceases. Upon seating of the supply valve 76, the supply chamber 62 is again closed to the delivery chamber 68 and further increase in pressure in said delivery chamber and thereby in the diaphragm chamber 85 will cease at this time. In absence of further increase in delivery pressure in the diaphragm chamber 85, the pressure force on one side of the diaphragm 79 will balance with the spring force on its opposite side and further deflection of said diaphragm will cease at this time, with the supply valve 76 and exhaust valve 81 seated. If stem 72 subsequently is moved inwardly of casing 60 a greater amount, element 71 again will be moved downwardly to unseat from the supply valve 76 and the above described action will repeat, with a resulting increase in pressure of fluid in the delivery chamber 68 and hence in the speed control pipe 9 to call for corresponding increase in the speed setting of the governor device 5. The pressure of fluid thus obtained in the delivery chamber 68 and pipe 9 will vary in proportion to the degree of movement of stem 72 inwardly of the casing 60.

If, subsequently, the operating stem 72 attached to seat element 71 in device 7 is allowed to be moved outwardly of the casing 60 by action of spring 83 to a more extended position, the supply valve 76 and attached exhaust valve 81 will be carried with said element. The exhaust valve 81 thus is unseated from seat element 78, uncovering the respective end of opening 80, thereby allowing fluid under pressure in delivery chamber 68 to flow to chamber 69 and to atmosphere. Delivery pressure in chamber 68 and pipe 9 is caused to reduce, and such reduction, reflected in diaphragm chamber 85, allows the control spring 87 to deflect the diaphragm 79 upwardly, as viewed in the drawing. Upward deflection of the diaphragm 79 carries the element 78 into engagement with the exhaust valve 81, again closing off the upper end of the opening 80. The delivery chamber 68 thus again will be closed to the exhaust chamber 69 and further reduction in delivery pressure thereby terminated at this time. Under such condition, the diaphragm 79 ceases further deflection, and both the supply valve 76 and the exhaust valve 81 remain seated. A reduced delivery pressure in accord with extended position of the operating stem 72 thus is secured.

It will be seen now, that by adjustment of the position of the operating stem 72 in the speed control self-lapping valve device 7, variations in pressure of fluid in the speed control pipe 9 and thereby in chamber 50 in cylinder device 6 may be effected for controlling the speed setting of the governor device 6 accordingly.

The operator's control device 8, in addition to comprising the speed control self-lapping valve device 7 also may comprise ahead, astern and start valve devices 100, 101, 102 respectively, within the body 61, as well as means for actuating said devices through movement of a single operator's control handle 103 which also controls the speed control valve device 7, as will be pointed out.

The valve devices 100, 101, 102 may be identical in structure, each comprising a fluid pressure supply valve 105 contained in a chamber 106 and arranged to control communication between said chamber 106 and a chamber 107 through an opening encircled by a seat provided for engagement by said valve to close said communication. A spring 108 in chamber 106 acts on the valve 105 for urging it into contact with its seat. The valve 105 is connected by a stem 109, extending with clearance through the valve seat, to a release valve seat element 110 which is slidably mounted in a suitable bore in the body. A central opening 111 extends through the valve 105, stem 109 and seat element 110 to serve as a communication for connecting the chamber 106 to an exhaust chamber 112 which is open to atmosphere by way of a port 113 in the body 61. A release valve 114 is disposed in the exhaust chamber 112 for seating engagement with the seat element 110 to close chamber 106 from the chamber 112 by way of the opening 111. The release valve 114 may be actuated, through the medium of a stem 115, into such seating engagement with element 110 and thereby effect unseating of the supply valve 105.

In each of the several valve devices, the chamber 107 is connected to a reservoir 63 by way of a passage 64 in the body 61, a pipe 65, a reducing valve 66, and a pipe 67, so that each chamber 107 will be constantly supplied with fluid under pressure when the system is in use.

Chambers 106 in the ahead and astern valve devices 100 and 101 are connected to the ahead and astern control pipes 11 and 12, respectively, leading to the maintaining cylinder device 13 and to the directional interlock device 18. Chamber 106 in the start valve device 102 is connected to a start control pipe 120 leading to the cam shift interlock device 24.

Disposed transversely to the projecting ends of the stems 115 of the valve devices 100 and 101 and of the stem 72 of the valve device 7 is a hollow control shaft 116 which is suitably journaled at its opposite ends in a cover secured to the body 61. A plunger 117 is slidably mounted in the control shaft 116 with its left-hand end projecting outwardly beyond the adjacent end of the control shaft parallel to the stem 115 of the start valve device 102. A hollow cam shaft 118 is sleeved onto and secured to the control shaft 116, bearing at opposite ends against the cover and thereby holding both shafts 116, 118 against axial movement.

The shafts 116 and 118 and the plunger 117 are provided with aligned longitudinally extending slots through which extends the lower end portion 119 of the operator's control handle 103 which is pivotally mounted on a pin 121 carried by a lug 122 projecting upwardly from the cam shaft 118. In the lower end portion 119 of the control handle is a slot 123 within which is disposed a transversely extending pin 124 which is secured to plunger 117. It will be seen that rocking of the operator's control handle 103 about the pin 121 in a direction longitudinally of the cam shaft 118 will shift the plunger 117 lengthwise within the control shaft 116, while movement of said lever in a direction about the axis of said cam shaft will rotate said cam shaft without effecting endwise movement of plunger 117.

The control handle 103 extends through a guide slot 125 in the cover which provides a definite path for movement of said lever. This slot is shown in plan view in Fig. 2 of the drawing and comprises a central portion to permit movement of the handle 103 in a direction circumferentially of the cam shaft 118. Adjacent to one end of the slot 125 a short slot 126 is provided at right angle to said slot 125, while adjacent to the opposite end of said slot 125 there is another short slot 127 extending in the same direction and parallel to slot 126. The slots 126, 127 provide for rocking movement of the operator's handle 103 about pin 124 for moving plunger 117 outwardly of the central shaft 116.

The cam 84 is secured to cam shaft 118 for turning movement therewith. Cams 130, 131 are also secured to said shaft 118 for operative engagement with stems 115 of the ahead and astern valve devices 100 and 101, respectively. A lever 132 is arranged to operatively connect the plunger 117 to the stem 115 of the start valve device 102.

Referring to Figs. 1 and 2 in the drawings, in a "Stop" position of handle 103, the cam 84 will be so positioned as to condition the speed control valve device 7 for establishing a minimum pressure of fluid in the speed control pipe 9, such as atmospheric pressure for example. At this time cams 130 and 131 will be in such positions, in which positions they are shown in the drawing, as to hold the respective supply valves 105 unseated through seating engagement of the respective release valves 114 attached to stems 115. The supply valve 105 in the start valve device 102 will be closed and the release valve 114 therein will be open. In "Stop" position of handle 103, with the system in operation, fluid under pressure from reservoir 63 will charge both the ahead and astern control pipes 11 and 12 by way of the unseated supply valves 105 in the valve devices 100 and 101, while the start control line 120 will be vented to atmosphere by way of the unseated release valve 114 in valve device 102.

If handle 103 is moved out of its "Stop" position in slot 125 in the direction marked "Ahead," toward and to a "Run and idle" position the cam shaft 118 and cams 84, 130 and 131 will be turned with said handle. Cam 84 is so shaped as to maintain the speed control valve device 7 adjusted to maintain minimum pressure in the speed control pipe 9 during such movement, while cam 131 will maintain the supply valve 105 in the ahead valve device 100 unseated so that the ahead control pipe 11 will remain charged, and the cam 130 will allow spring 108 in the astern control device 101 to close the corresponding supply valve therein and allow fluid under pressure to unseat the respective release valve 114 to vent fluid under pressure from the astern control pipe 12 to atmosphere. If handle 103 is moved from "Ahead" "Run and idle" into slot 127 to the "Start" position therein, through resultant outward movement of the plunger 117 acting through the lever 132, the release valve 114 in the start valve device 102 will be closed and the supply valve 105 therein will be unseated to allow fluid under pressure from reservoir 63 to flow into the start control pipe 120. When the handle 103 is moved out of slot 127 back to slot 125 to "Ahead" "Run and idle" position, the plunger 117 will be retracted inwardly and, acting through lever 132, will allow spring 108 in the start valve device 102 to close the supply valve 105 and will allow fluid under pressure in the start control pipe 120 to unseat the release valve 114 and vent to atmosphere. If handle 103 is moved from "Run and idle" to or toward "Full speed" position, cam 84 will turn with shaft 118 connected to said handle and thereby adjust position of stem 72 accordingly to call for an increase in pressure of fluid in the speed control pipe 9 up to a maximum corresponding to "Full speed" position of said handle. Return of handle 103 toward or to "Run and idle" will cause the speed control valve device 7 to effect reduction of the pressure of fluid in the speed control pipe 9 accordingly. As long as the handle 103 is in some position on the "Ahead" side of "Stop" position, the ahead control pipe 11 will remain charged with fluid under pressure while the astern control pipe 12 will remain vented to atmosphere. Upon returning handle 103 to "Stop" position, again both the ahead and astern control pipes 11 and 12 will be charged with fluid under pressure while the start control pipe 120 and the speed control pipe are vented to atmosphere.

If the handle 103 is moved out of "Stop" position to any position in the "Astern" direction, cams 130 and 131 will so position valve devices 100 and 101 as to maintain the ahead control pipe 11 vented to atmosphere and astern control pipe 12 charged with fluid under pressure. Similar to previous description, if handle 103 is moved into slot 126 to "Start" position therein, the start valve device 102 will be caused to effect supply of fluid under pressure to the start control pipe 120, and such supply will be terminated and said pipe vented to atmosphere when handle 103 is returned to slot 125. As before, if handle 103 is moved to positions to and between "Run and idle" and "Full speed" positions on the "Astern" side of "Stop" position, cam 84 will effect adjustment of the speed control valve device 7 to establish pressure of fluid in the speed control pipe 9 accordingly, between a minimum pressure corresponding to said "Run and idle" position and a maximum pressure corresponding to said "Full speed" position. Between "Stop" position and "Run and idle" position of the handle 103 on the "Astern" side of "Stop" position the speed control valve device 7 will remain adjusted to maintain a minimum pressure of fluid in the speed control pipe 9.

The cam shift cylinder device 10 may be of the usual structure and for sake of illustration may comprise a hollow cylindrical casing 140 having a cam shift piston 141 slidably disposed therein and dividing the interior of said casing into a pressure chamber 142 at one side and a pressure chamber 143 at the opposite side. Piston 141 is operatively connected to the engine cam shaft 2 and will assume a position in which it is shown in the drawing upon supply of fluid under pressure to the chamber 143 and release of fluid under pressure from chamber 142 to position said cam shaft for operation in the ahead direction. If, conversely, chamber 143 is vented to atmosphere and chamber 142 is supplied with fluid under pressure, the piston 141 will assume an opposite position for causing cam shaft 2 to condition the engine for operation in its opposite or astern direction.

The maintaining valve device 14, for sake of illustration, may comprise ahead and astern valve structures disposed within a casing common to both. Both the ahead valve structure and the astern valve structure may comprise a supply valve 148 disposed within a supply chamber 149 adapted to be connected constantly to a source of fluid under pressure, independent of the reservoir 63, such as the reservoir 150 by way of pipe 151, the reducing valve 152 and the pipe 153. The supply valve 148 is attached to a fluted stem which is slidably mounted in a suitable bore extending through a partition separating the supply chamber 149 from delivery chamber 154. A release valve 156 is attached to a fluted stem slidably mounted in a suitable bore which opens the chamber 154 to the atmosphere. The fluted stems of the valves 148 and 156 meet in the chamber 154 and a spring 157 is disposed in chamber 149 in such a manner that the supply valve 148 is urged toward a seated position in which said supply chamber is closed to delivery chamber 154 and the release valve 156 is urged toward an unseated position in which said delivery is open to atmosphere. In the ahead valve structure, the delivery chamber 154 is connected to the chamber 143 in the cam shift cylinder device 10 by way of a pipe 158 and in the astern valve structure the corresponding delivery chamber is connected to the chamber 142 in said device 10 by way of a pipe 159. To close the release valve 156 and open the supply valve 148 against opposition of the spring 157, in both valve structures an inverted T-shaped lever 160 is provided which is rockably mounted on a projecting lug attached to the casing of the valve device 14. The lever is adapted to be rocked to an "Ahead" position, in which it is shown in the drawing, holding the release valve 156 in the ahead valve structure closed and the supply valve 148 in said structure open, whereby fluid under perssure from the supply chamber 149 in said structure flows via the respective delivery chamber 154 and pipe 158 to chamber 143 in cam shift cylinder device 10. At the same time, lever 160 will be out of contact with the release valve 156 in the astern valve structure so that said release valve will remain open, in which position it is shown in the drawing, venting the chamber 142 in device 10 to atmosphere. Lever 160 is movable to an opposite or "Astern" position, indicated by a dot-and-dash line so titled in the drawing, in which the supply valve 148 in the ahead valve structure is closed and the release valve 156 therein opening the chamber 143 in device 10 to atmosphere, while the corresponding release valve in the astern valve structure is held closed and the corresponding supply valve held open by said lever, so that the respective supply chamber 149 will be open to chamber 142 in said device 10. Once the lever 110 is caused to assume either its "Ahead" or its "Astern" position it will be held therein by over-center action of a maintaining spring 161 adapted and arranged to serve such purpose.

The maintaining cylinder device 13 may comprise a hollow cylindrical casing having a piston 162 slidably disposed therein and dividing the interior into a pressure chamber 163 open to the ahead control pipe 11 and a pressure chamber 164 open to the astern control pipe 12. The piston 162 is operatively connected to the lever 160 of the maintaining valve device 14 by means such as a rod 165. By supply of fluid under pressure to the chamber 163 in cylinder device 13, when chamber 164 therein is vented the piston 162 therein is caused to assume an "Ahead" position in which it is shown in the drawing, for positioning the lever 160 in its "Ahead" position. Upon venting of chamber 163 in device 13 to atmosphere and effecting supply of fluid under pressure to the chamber 164, the piston 162 will move to an opposite or "Astern" position, and will cause the lever 160 to assume its "Astern" position.

For sake of illustration, the fluid pressure operated brake 15 may comprise a brake cylinder 167 having the usual brake cylinder piston 168 slidably disposed therein and operatively connected to a brake shoe 169 for frictional engagement with a rotary part of the engine such as the crank shaft 1. By supply of fluid under pressure to a pressure chamber 170 at one side of the brake cylinder piston 168, the brake shoe 169 will be brought into frictional engagement wiht the shaft 1, thereby imposing a restraining force thereto which opposes its rotation. Upon release of fluid under pressure from the pressure chamber 170, the usual return spring 171 at the opposite side of the brake cylinder piston 168 will return said piston and brake shoe 169 to a rest position in which they are shown in the drawing for releasing the braking force on shaft 1.

The relay valve device 16 for directly controlling supply of fluid under pressure to operate the brake 15 may comprise a casing 173 having a diaphragm 174 disposed therein, which diaphragm is subject to pressure of fluid in a control chamber 175 on its one side and to pressure of fluid in a chamber 176 on its opposite side, which latter chamber is constantly open to atmosphere by way of a port 177 in the casing. Also formed in the casing are chambers 178, 179, 180; chamber 178 being separated from chamber 176 by a partition 181 and from chamber 179 by a partition 182. A partition 183 separates chambers 179 and 180. A valve 184 is disposed in chamber 180 for controlling communication between said chamber 180 and the chamber 179. The valve 184 is secured to a fluted stem 185 which is slidably disposed in a suitable bore in the partition 183, a seat being formed at one end of said bore to accommodate said valve. A bias spring 186 is disposed in the chamber 180 and arranged to urge the valve 184 in the direction of its seat. A valve 187, similar to valve 184, is disposed in the chamber 178 for controlling communication between said chamber 178 and the chamber 179 by way of a bore extending through the partition 182. For slidably guiding the valve 187, a fluted stem 188 is attached thereto and slidably disposed in the abovementioned bore in partition 182. A valve seat is formed in the partition 182 encircling one end of the bore therein for accommodating the valve 187. The fluted stems 185 and 188 project into and meet in the chamber 179 in such a manner that action of the bias spring 186 on the valve 184 in urging same toward its seat will at the same time urge the valve 187 away from its seat. If the valve 184 is seated, the valve 187 will be unseated, and conversely, if said valve 187 is seated, said valve 184 will be unseated. The valve 187 is operably connected to the diaphragm 174 by means of a rod or stem 190 which extends through chamber 176 and a bore provided in the partition 181 in which bore said rod is slidably disposed. A control spring 191 is disposed in the chamber 176 and arranged to oppose deflection of the diaphragm 174 in the direction of said chamber 176 as caused by pressure of fluid in the control chamber 175.

In operation of the relay valve device 16, same will respond to establishment of a certain pressure of fluid in its control chamber 175, through deflection of diaphragm 174, to close the valve 187 and open the valve 184 and thereby establish what will hereinafter be referred to as a communication 195 connecting the chamber 179 to the chamber 180 by way of the unseated valve 184 while at the same time disestablishing what may hereinafter be referred to as a communication 196 connecting the chamber 178 to said chamber 179 by way of the previously unseated valve 187. Upon a subsequent reduction in pressure of fluid in the control chamber 175 in the relay valve device below the certain value, through action of springs 186, 191, the valve 184 will seat and the valve 187 will unseat to disestablish communication 195 and reestablish the communication 196.

In the relay valve device 16 the chamber 179 is connected to the brake cylinder pressure chamber 170 by way of a pipe 197, the chamber 180 is connected to the pipe 151 for adequate supply of fluid under pressure from the reservoir 150 and the chamber 178 is connected to atmosphere by way of an exhaust pipe 198.

The fluid pressure operated fuel cut-off cylinder device 17 may, for sake of illustration, comprise a hollow casing 200 in which a piston 201 is slidably disposed, dividing the interior of said casing into a pressure chamber 202 at its one side and a spring chamber 203 open to atmosphere at its opposite side. A piston rod 204 is secured for movement with the piston 201 and adapted for operative engagement with the fuel control lever 4 to effect movement of same to its "Fuel off" position upon supply of fluid under pressure to chamber 202. A return spring 205 is disposed in chamber 203 and arranged to effect return of piston 201 and rod 204, upon release of fluid under pressure from chamber 202, to a rest position, in which they are shown in the drawing, with said rod out of engagement with the fuel control lever 4, allowing same its freedom for movement.

The directional interlock device 18, referring to Fig. 3 in particular, may comprise a casing having two poppet valves 231 and 232 contained in chambers 233 and 234 respectively, which are open to the ahead and astern control pipes 11 and 12, respectively. The poppet valves 231 and 232 are arranged side by side with parallel extending fluted stems 235 and 236, respectively, which extend into a chamber 237 common to both and connected to a pipe 238. The pipe 238 is in turn connected to the chamber 178 in the brake interlock device 19, which is similar to the valve device 16, to the chamber 202 in the fuel cut-off cylinder device 17, and to one inlet of the double check valve device 23. The valves 231 and 232 are provided to control communication between the chambers 233 and 234, respectively, and the chamber 237. A spring 238 in each of the chambers 233 and 234 acts on the respective valve 231, 232 to urge same toward a closed position, in which position the valve 231 is shown in Fig. 3 in the drawings.

The valve stems 235 and 236 engage, respectively, two spaced apart operating plungers 239 and 240 which are slidably mounted in the casing and which are provided with stems 241 and 242 which extend outwardly therethrough through sealing rings 243 which cooperate with said stems to prevent leakage of fluid under pressure from the chamber 237 to the atmosphere. Two rockable cams 244 and 245, fulcrumed on pins secured in the casing, are provided for actuating the plungers 241 and 242, respectively. These cams may be identical but reversely arranged, and each is operatively connected to the respective plunger 241, 242 through the medium of a follower element 247 rockably mounted on a pin secured in the casing. Each of the cams 244 and 245 is provided with a surface 249 which, when in engagement with the respective element 247, will unseat the respective valve 231 or 232. Adjacent to the surface 239 each cam is provided with a recess 250 which is adapted to receive the respective element 247 to permit movement of the respective plunger 239 or 240 by a spring 251 to a position to permit closure of the respective valve 231 or 232 by the respective spring 238.

The two cams 244 and 245 are operatively connected for movement in unison by a link 252, and since the cams are reversed as above mentioned, movement of the link and cams to the position in which they are shown in the drawing will effect closure of the valve 231 and opening of the valve 232; while movement of said link and cams in a clockwise direction, as viewed in the drawing, to a position in which surface 249 on the cam 244 engages the respective element 247 will effect opening of the valve 231 and closing of the valve 232.

The directional control device 18 further comprises a control piston 254 which is operatively connected to the link 252 by means of a piston rod 255 extending through a non-pressure chamber 256 at one side of said piston. At the opposite side of piston 254 there is a pressure chamber 257 which is in constant communication through a pipe 258 to the chamber 179 in the starting interlock device 21 which is similar to the device 16 previously described.

The opposite or outer end of the piston rod 255 is provided with a friction shoe 261 which is adapted and arranged for frictional engagement with the outer surface of the crank shaft 1. The piston rod 255 is operatively connected by means of a pin 259 to one end of a link 263, the opposite end of which is operatively connected by means of a pin 263' to the link 252.

The piston rod 255 is capable of side movement in the non-pressure chamber 256 from the position in which it is shown in the drawing, and which is defined by contact with a surface 264 in the casing, to a position in which said rod engages a surface 265 in the casing. Adjacent to the surface 265, the casing is provided with a pin 266 arranged to engage in one of two recesses 267, 268 according to whether or not the piston rod is in the position in which it is shown in the drawing or in its position engaging surface 265.

When fluid under pressure is supplied to the pressure chamber 257, in a manner which will later be described, the piston 254 will move the friction shoe 261 into engagement with the shaft 1, which, if rotating will bias the rod 255 toward one or the other of surfaces 264 or 265, according to the direction in which said shaft is turning. At the time of engagement of shoe 261 with the shaft 1, the link 263 will be disposed away from the pin 266 so that the rod 255 is free for sidewise movement to effect positioning of cams 244 and 245 accordingly. If, at the time of engagement of shoe 261 with the shaft 1, said shaft is rotating in a direction to propel the ship ahead, the rod 255 is biased to the position in which it is shown in the drawing leaning against surface 264 and cams 244 and 245 will be caused to assume the positions in which they also are shown in the drawing with valve 231 closed and valve 232 open connecting the pipe 238 to the astern control pipe 12. If, conversely, the shaft 1 is rotating in the opposite or astern direction at time of engagement by shoe 261, the rod 255 will move to leaning engagement with the surface 265 and shift cams 244, 245 to cause the valve 232 to close and the valve 231 to open, disconnecting pipe 238 from the astern pipe 12 and connecting said pipe 238 to the ahead pipe 11. If, however, at the time that the shoe 261 engages shaft 1, said shaft is not rotating, the rod 255 will remain in leaning engagement with the one or the other of surfaces 264, 265 it previously assumed. Upon release of fluid under pressure from the chamber 257, a spring 270 will move the piston 254 in the direction of said chamber to a rest position in which it is shown in the drawing, while the shoe 261 will thereby be moved to a corresponding rest position seated on accommodating shoulders 271 formed in the casing, and the link 263 will return into contact with the pin 266 projecting into one or the other of recesses 267 or 268, thereby locking the piston rod 255, cams 244 and 245 and the valves 231 and 232 in the positions which they assumed when shoe 261 last engaged the shaft 1.

The brake interlock device 19, starting air control valve device 20, starting interlock device 21, and the cam shift interlock device 24, all of which are shown in outline may be substantially similar to the device 16 for sake of illustration, and for description of the parts thereof, reference may be made to the previous description of said device 16. In operation of each of these devices, upon supply of fluid under pressure to its respective control chamber its communication 195 is established, indicated by a dotted line in the drawing, connecting its chamber 179 to chamber 180, and upon release of fluid under pressure from its control chamber 175, the communication 196 is established, indicated symbolically by a solid line in the drawing, connecting said chamber 179 to its chamber 178.

In the device 19, its chamber 179 is connected to the control chamber 175 in the device 16 by way of a pipe 300, its chamber 180 is connected to atmosphere by way of a pipe 301, and its chamber 178 is connected to the pipe 258 as previously mentioned.

In the starting air control valve device 20, its control chamber 175 is connected to the corresponding control chamber in device 19, to the chamber 179 in device 21 and to chamber 257 in device 18 by way of the pipe 258, its chamber 178 is connected to the atmosphere by way of a pipe 198, its chamber 179 is adapted to be connected to the starting valves (not shown) of the engine by way of a pipe 303, and its chamber 180 is connected to the pipe 153 for supplying fluid under pressure thereto from the reservoir 150.

In the starting interlock device 21, its control chamber 175 is connected to the outlet of the double check valve device 23, to be described subsequently, by way of a pipe 304, its chamber 178 is connected to atmosphere via a pipe 198, its chamber 179, as aforementioned, is connected to the pipe 258, and its chamber 180 is connected to the chamber 179 in the cam shift interlock device 24 by way of a pipe 322.

The starting air cut-off valve device 22 may comprise a casing 305 having a supply chamber 306 connected to the pipe 151 as source of fluid under pressure, a delivery chamber 307 connected the other inlet of the double check valve device 23, by way of a pipe 307', and an exhaust chamber 308 open to atmosphere by way of a port 309. A supply valve 310 is disposed in the supply chamber 306 for controlling communication between said supply chamber and the delivery chamber 307 by way of an opening in a partition 311 separating one chamber from the other. A seat is formed in the partition 311 encircling the opening therein to accommodate the supply valve 310. A compression spring 312 is also disposed in the supply chamber 306, arranged to urge the supply valve 310 toward a seated position closing the supply chamber from the delivery chamber. The supply valve 310 is connected, by means of a stem extending freely through the opening in partition 311 and the delivery chamber 307, to an exhaust valve seat element 313 slidably mounted within the casing and dividing the delivery chamber 307 from the exhaust chamber 308. An opening 314 in the exhaust valve seat element and the stem is provided to serve as a communication for connecting the delivery chamber 307 to the exhaust chamber 308 when desired. An exhaust valve 315 is disposed in the exhaust chamber 308 and arranged to cooperate with the seat element 313 to close said chamber 308 to the opening 314. A stem 316 is attached to the exhaust valve 315 and is arranged for contact with a cam 317 secured for turning movement with the fuel control shaft 3 and lever 4. The cam 317 is provided with a raised portion 318 which remains in engagement with the stem 316 while the fuel control lever remains positioned at "Full fuel" and until its "Idling fuel" position is assumed, at which time said cam provides a recess 319 for said stem until the fuel control shaft attains its "Fuel off" position. With the stem 316 in engagement with the raised portion 318 of the cam 317, in which engagement it is shown in the drawing, the exhaust valve 315 will be seated on seat element 313 closing off the exhaust chamber 308 from the delivery chamber 307 by way of the opening 314 and the supply valve 310 will be unseated, opening the supply chamber 306 to said delivery chamber. When the recess 319 in cam 317 is presented to the stem 316, the spring 312 will seat the supply valve 310 while pressure of fluid in the delivery chamber 307 acting on the exhaust valve 315 within opening 314 will unseat said valve, displacing the stem 316 into said recess 319.

The double check valve device 23 may be of any well-known structure, and for the sake of illustration may comprise a hollow cylindrical casing having a piston valve 320 slidably disposed therein and subject to pressure of fluid in the pipe 238 one side and to pressure of fluid in the pipe 307' at its opposite side. Piston valve 320 will respond to supply of fluid under pressure to one or the other of pipes 238, 307' to shift to a position for opening communication between the pressurized pipe to the pipe 304 and for closing communication between the non-pressurized pipe 238 or 307' and said pipe 304. Thus it will be seen that if either of the pipes 238 or 307' is pressurized, fluid under pressure will be supplied to the pipe 304. Only when both of the pipes 238 and 307' are vented to atmosphere will the pipe 304 be so vented by way of one of said pipes or the other.

In the cam shift interlock device 24, its control chamber 175 is connected to the inverse double check valve device 25 by way of a pipe 321, its chamber 178 is connected to the atmosphere by such as a pipe 198, its chamber 179 is connected to the chamber 180 in device 21 by way of the pipe 322 as aforementioned, and its chamber 180 is connected to the start control pipe 120.

The inverse double check valve device 25 may comprise a casing 323 having a bushing 324 which is encircled midway between its ends by an annular chamber 325 connected to the pipe 321. The bushing 324 is provided interiorly and midway between its ends with a bridge having an axial bore 326 open to chamber 325 through a plurality of radial openings 327. At one end of the bore 326 is an annular seat arranged for sealing engagement by a valve 328 contained in a chamber 329, while at the opposite end of said bore is an oppositely arranged annular seat provided for sealing engagement by a valve 330 contained in a chamber 331. The two valves 328 and 330 are connected for movement in unison by a stem 332 extending with clearance through the bore 326. This stem is of such construction as will allow flow of fluid under pressure past either valve 328 or 330, when unseated, through the bore to the annular chamber 325.

Chamber 331 is connected to a pipe 333 arranged to be connected to the chamber 143 in the cam shift cylinder device 10 just to the right of the cam shift piston 141 when said piston is in its position in which it is shown in the drawing for operation of the engine in the ahead direction. The chamber 329 in the double check valve device 25 is connected to a pipe 334 arranged to be opened to the chamber 142 in the device 10 just to the left of the cam shift piston 141 when said piston is in its position opposite to that in which it is shown in the drawing for operation of the engine in its astern direction.

In operation of the inverse double check valve device 25, when only one of the pipes 334 or 333 is charged with fluid under pressure, the respective valve 328 or 330 will close to prevent fluid under pressure from flowing into the pipe 321, When both of the pipes 334 and 333 become charged, fluid under pressure will flow from one or the other of these pipes by way of whichever of the valve 328, 330 is unseated into the pipe 321. It will be appreciated that subsequent release of fluid under pressure from the pipe 321 will occur when either one, the other, or both of the pipes 334, 333 are vented to atmosphere.

*Operation of the apparatus shown in Fig. 1*

In operation, let it be assumed initially that both of the reservoirs 69 and 150 are charged with fluid under pressure from a source thereof such as a compressor or compressors (not shown), that the engine is stopped after having previously operated in its ahead direction, and that the handle 103 of the operator's control device 8 is in its "Stop" position, charging the ahead and astern control pipes 11, 12 with fluid under pressure and opening the start control pipe 120 and the speed control pipe 9 to atmosphere. Chambers 163 and 164 in the maintaining cylinder device 13 will thus both be charged with fluid under pressure so that the piston 162 therein will be in a static condition, for instance in the position in which it is shown in the drawing, with the maintaining valve device 14 positioned to effect charging of the pipe 158 with fluid under pressure from the pipe 151 and venting of the pipe 159 to atmosphere. With the pipe 158 charged and the pipe 159 vented, chambers 143 and 142 in the cam shift cylinder device 10 will be charged and vented, respectively, and the cam shift piston 141 will be in its ahead position, in which it is shown in the drawing, and held therein by pressure of fluid in chamber 143 to maintain the engine cam shaft 2 positioned for operation of the engine in its ahead direction. Both of the pipes 333, 334 leading to the inverse double check valve device 25 will be charged with fluid under pressure from the chamber 143 in the cylinder device 10, so that the pipe 321 will also be charged with fluid under pressure from said device 25. The cam shift interlock device 24 will be conditioned, by charging of its control chamber 175 connected to the pipe 321, establishing its communication 195 connecting the start control pipe 120 to the pipe 322 and to the chamber 180 in the starting interlock device 21. The directional interlock device 18 may be in its ahead position, in which it is shown in the drawing, which it assumed during previous operation of the engine in its ahead direction. The charged astern control pipe 12 will be connected via the directional interlock device 18 to the pipe 238, so that chamber 202 in the fuel cut-off cylinder device 17 will be charged with fluid under pressure via said pipe 238, as will be the chamber 178 in the brake interlock device 19 and one inlet of the double check valve device 23. The fuel cut-off cylinder device 17 will be in a position opposite to that in which it is shown in the drawing with rod 204 in engagement with and holding the fuel control lever 4 in its "Fuel off" position, against action of the spring 44 in the governor device 5, since the crank shaft 1 is not turning. The cam 317 secured for movement with the fuel control shaft 4, now in its "Fuel off" position will be positioned to present the recess 319 to the stem 316 thus allowing the starting air cut-off valve device 22 to assume its position opposite to that in which it is shown in drawing, disconnecting the pipe 151 from the pipe 307' hence from the other inlet to the double check valve device 23, and connecting said pipe 307' to atmosphere via port 309. The pipe 304, hence the control chamber 175 in the starting air interlock device 21, will be charged with fluid under pressure from the pipe 238 via the double check valve 23 so that said device 21 will be positioned to establish its communication 195 connecting the now vented pipe 322 to the pipe 258. The pipe 258 therefore will be vented to atmosphere with the pipe 322, as therefore will be the chamber 257 in the directional interlock valve device 18, the control chamber 175 in the starting air control valve device 20 and the corresponding control chamber 175 in the brake interlock device 19. The shoe 261 of the directional interlock device 18 will be in its rest position disposed out of engagement with the shaft 1, in which position it is shown in Fig. 3, the starting air control valve device 20 will be positioned establishing its communication 196 and thereby connecting the pipe 303 connected to the starting valve mechanism in the engine to the pipe 198 to atmosphere. The brake interlock device 19 will be positioned also establishing its communication 196 connecting the now charged pipe 238 to the pipe 300, hence to the control chamber 175 in the relay valve device 16, which, therefore, also will be so charged. The device 16, therefore, will be positioned to establish its communication 195 connecting the pipe 197, therefore brake cylinder chamber 170, to the pipe 151 from the reservoir 150. The brake 15 therefore will be in an applied position opposite to that in which it is shown in the drawing, with its shoe 169 in engagement with the shaft 1.

Now let it be assumed that the operator desires to start the engine for operation in the same or ahead direction in which it last operated, as determined by position of the cam shift piston 141.

The operator will move the control handle 103 in the control device 8 from "Stop" position to the "Ahead" "Start" position in the slot 127. This movement of the handle 103 will effect a supply of fluid under pressure to the start control pipe 120 and will effect venting of fluid under pressure from the astern control pipe 12, while maintaining the ahead control pipe 11 charged with fluid under pressure and the speed control pipe 9 vented to the atmosphere, as will be appreciated from previous description.

Since the piston 162 in the maintaining cylinder device 13 was previously in its ahead position at the time that fluid under pressure is thus released from the astern control pipe 12 and thereby the chamber 164 in said device 13, said piston 162 will not change such position, so that the maintaining valve device 14, hence the cam shift cylinder device 10 and therefore the engine cam shaft 2 also do not change position and are correctly positioned for operation of the engine in the ahead direction. The chamber 143 in the cam shift cylinder device 10 remains charged with fluid under pressure from the device 14, while chamber 142 in said device 10 remains vented to atmosphere. Both of the pipes 333 and 334, remaining connected to the chamber 143 in the cam shift cylinder device 10, remain charged with fluid under pressure so that the pipe 321 connected to the control chamber of the cam shift interlock device 24 will remain charged with fluid under pressure from the inverse double check valve device 25, as previously described.

Venting of fluid under pressure from the astern control pipe 12 results, substantially at the same time, in venting of fluid under pressure from the pipe 238 by way of the directional interlock device 18, hence venting of fluid under pressure from the chamber 178 in brake interlock device 19, from the chamber 202 in the fuel cut-off cylinder device 17 and from the one inlet of the double check valve device 23, which are connected to said pipe 238. This venting of fluid under pressure from the chamber 178 in the brake interlock device 19, which maintains its communication 196 at this time as will be pointed out, will effect venting of fluid under pressure from the control chamber 175 in the device 16, which therefor will respond to disestablish its communication 195 connecting the supply pipe 151 to the pipe 197 and establishing its communication 196 connecting said pipe 197, hence brake cylinder chamber 170 to atmosphere, thereby releasing the brake 15, which will assume the position in which it is shown in the drawing. Venting of fluid under pressure from the chamber 202 in the fuel cut-off cylinder device 17 will allow the spring 205 to move the piston 201 and rod 204 to their rest position in which they are shown in the drawing, with said rod disposed away from the fuel control shaft 4 which will assume its "Full fuel" position, in which position it is shown in the drawing, by action of the spring 44. The cam 317 moving with shaft 4 to its "Full fuel" position, therefore assumes the position in which it is shown in the drawing, with the raised portion 318 of said cam in displacing engagement with the stem 316 of the device 22, which device assumes the position in which it is shown in the drawing connecting the pipe 307', hence one inlet of the double check valve device 23, to the supply pipe 151.

Since substantially at the time that one inlet of the double check valve device 23 is vented to atmosphere with the pipe 238 the opposite inlet of said double check valve device is supplied with fluid under pressure by way of the device 22 as just described, the status of the pipe 304 will remain the same at this time, that is charged with fluid under pressure. The control chamber 175 in the device 21 therefore also will remain charged with fluid under pressure, so that its communication 195 will remain established, connecting the now charged pipe 322 to the pipe 258.

At the time that the above is occurring, fluid under pressure from the start control pipe 120 will flow by way of the communication 195 in the device 24, the pipe 322, the corresponding communication 195 in the starting air control valve device 21, and the pipe 258 to the chamber 257 in the directional interlock device 18 to cause its shoe 261 to engage shaft 1 for sensing the direction of rotation thereof. Fluid under pressure from pipe 258 will flow also to the control chamber 175 in the device 19, which device responds to establish its communication 195 connecting the pipe 300 to atmosphere by way of the pipe 301 rather than by way of the pipe 238 still vented to atmosphere via the directional interlock device and the astern control pipe 12, and to the control chamber in the starting air control valve device 20 which responds to establish its communication 195 connecting the pipe 303 to the supply pipe 153.

With the pipe 300 still vented to atmosphere, the valve device 16 will remain conditioned to connect the brake cylinder chamber 170 to atmosphere via pipe 198 so that the brake 15 remains released to allow for rotation of the engine crank shaft 1. When the pipe 303 connected to the supply pipe 153, fluid under pressure or starting air will flow from the latter pipe to the former and thereby to the engine and will cause same to be turned over so that its crankshaft 1 is rotating at a certain relatively slow rate in its ahead direction. Since the directional interlock device 18 was previously set for rotation of shaft 1 in its ahead direction it will remain so set in accordance with the current rotation of said shaft in the same direction, maintaining the pipe 238 connected to the vented astern control pipe 12. At this time, therefore, the chamber 202 in fuel cut-off cylinder device 17 remains vented to atmosphere with stem 204 out of contact with fuel control lever 4, which remains in its "Full fuel" position.

While the engine is thus being turned over by starting air in its ahead direction, and with the fuel control shaft 4 in its "Full fuel" position, fuel is being supplied to the engine in a maximum amount along with the supply of such starting air, so that the engine will fire and start to run on fuel. When the engine thus starts to run on a maximum supply of fuel, its speed will start increasing above that at which it was turning over on the starting air above, at which time the speed governor device 5 will take control and effect adjustment of position of the fuel control lever 4 from "Full fuel" to "Idling fuel" position to limit the engine to operation at idling speed as called for by tension of spring 44 determined by the speed control cylinder device 6. Substantially at the time that the fuel control lever 4 attains its "Idling fuel" position, the raised portion 318 of the cam 317 will leave the stem 316 of the starting air cut-off device 22 and the recess 319 in said cam will be presented to said stem. The spring 312 in the device 22 will then become effective to seat the valve 310 and thereby disconnect the pipe 307' from the supply pipe 151. Since the pipe 238 connected to one inlet of the double check valve device 23 is vented to atmosphere via the directional interlock device 18, fluid under pressure from the control chamber 175 in the starting interlock device 21 will flow by way of said double check valve device, pipe 307', chamber 307 in device 22, opening 314, and after unseating valve 315, will flow by way of the chamber 308 and the port 309 in said device 22 to atmosphere.

When the control chamber 175 in the starting air interlock device 21 is thus vented to atmosphere, said device will respond to disestablish its communication 195 connecting pipe 258 to the pipe 322, thence to the start control pipe 120, and to establish its communication 196 connecting the pipe 258 to the pipe 198, thence to atmosphere. With the pipe 258 thus connected to atmosphere fluid under pressure from the control chamber in the brake interlock device 19 will thereby release to atmosphere, as will also fluid under pressure from the corresponding control chamber in the starting air control valve device 20. The device 19 will respond to such venting of fluid under pressure from its control chamber to establish its communication 196, connecting the pipe 300 to the still vented pipe 238, so that the status of the valve device 16 is not changed and the brake 15 remains released. Fluid under pressure vented from the control chamber in the starting air control valve device 20 conditions said device to disestablish its communication 195 connecting the pipe 303 to the supply pipe 153 and to establish its communication 196 connecting said pipe 303 to the pipe 198 hence to the atmosphere. According to a feature of the invention, supply of starting air to the engine is thus cut off automatically in response to running of the engine on fuel and the pipe 303 for conveying such starting air thereto is vented to the atmosphere without changing position of the operator's handle 103.

Opening of pipe 258 to atmosphere as just mentioned also releases fluid under pressure from chamber 257 in the directional interlock valve device 18 so that the brake shoe 261 thereof disengages the crank shaft 1, it being noted that said device performs no useful function in starting the engine in its last direction of operation. The utility of the directional interlock valve device 18 will be brought out later.

After the engine is running on fuel as just described, the operator may move the handle 103 out its "Ahead" "Start" position in the slot 127 to "Ahead" "Run and idle" position in the slot 125, thereby effecting venting of the start control pipe 120 to atmosphere while the speed, ahead, and astern control pipes 9, 11 and 12, respectively remain conditioned as in the "Ahead" "Start" position.

Venting of the start control pipe 120 to atmosphere at this time effects venting of fluid under pressure from the chamber 180 in the starting interlock device 21 by way of the pipe 322 and the communication 195 in the shift interlock device 24, and all devices in the system remain positioned as before after automatic cut-off of starting air.

While the engine is running on fuel in the ahead direction, to increase its power or speed of operation, the operator may adjust position of the handle 103 in the slot 125 between its "Run and idle" and "Full speed" positions at the "Ahead" side of "Stop" position, and thereby effect variation in pressure of fluid in the speed control pipe 9 to adjust position of the speed control piston 49 for controlling the speed setting of the governor device 5 accordingly, as will be appreciated from previous description. In response to an increase in its speed setting, the governor device 5 will cause movement of the fuel control lever 4 to cause a corresponding increase in fuel supply to the engine, and in so doing, the cam 317 will be caused to move its raised portion 318 into displacing engagement with stem 316. The device 22 will then respond to effect supply of fluid under pressure from the pipe 151 to the pipe 307', thence to the control chamber in the interlock device 21, which device will respond to connect the pipe 258 to the pipe 322, which is connected to atmosphere at this time by way of device 24 and the vented start control pipe 120. The starting air control valve device 20 therefore cannot be operated to supply starting air to the engine at this time, that is with the operator's lever 103 out of the starting slot 127.

From the above description it will be noted that restarting the engine in the last direction of operation consists essentially of releasing fluid under pressure from the pipe 238 by way of the directional interlock device 18 and the astern control pipe 12 to effect release of the brake 15 and of the fuel cut-off cylinder device 22 to allow the fuel control shaft 4 to be moved to its "Full fuel" position and, at the same time, of conditioning the device 22 to effect operation of the starting interlock device 21 to connect the pipe 322, open to the start control pipe 120, to the pipe 258. By supply of fluid under pressure to the start control pipe 120, fluid under pressure is supplied via the pipe 258 to operate the starting air control valve device 20 to effect supply of starting air to the engine to turn same over at a relatively slow rate while fuel is supplied simultaneously to the engine. When the fuel fires and the engine starts to run same, the governor device 5 being set for idling speed, effects movement of the fuel control lever 4 from its "Full fuel" position to its "Idling fuel" position, thereby effecting adjustment of the valve device 22 and causing the starting air to be cut off automatically by supplying fluid under pressure to the control chamber of the starting interlock device 21, which responds to vent the control chamber of the starting air control valve device 20 to atmosphere, which device 20 responds to disconnect the pipe 303 to the engine from the fluid pressure supply pipe 153. With the engine thus operating on fuel in the proper direction after automatic cut-off of supply of starting air to the engine, the handle 103 may be moved to the respective "Run and idle" position, between which position and "Full speed" position said handle may be adjusted to control the speed of the engine accordingly.

When the operator desires to stop the engine, he will move the control handle 103 to "Stop" position for supplying fluid under pressure to the astern control pipe 12 and thus to the pipe 238 by way of the directional interlock device 18, and from the pipe 238 to the control chamber in valve device 16 via pipe 300 and communication 196 in the brake interlock device 19, to the chamber 202 in the fuel cut-off cylinder device 17 and through the double check valve device 23 to the control chamber in the starting interlock device 21. Thus the valve device 16 is caused to establish its communication 195 to effect supply of fluid under pressure to the brake cylinder chamber 170 for applying the brake 15 to stop rotation of the engine crank shaft 1, while at substantially the same time or slightly before such brake is applied, fluid under pressure supplied to the chamber 202 in the fuel cut-off cylinder device 17 causes the piston 201 and rod 204 therein to move the fuel control lever 4 to its "Fuel off" position to shut off supply of fuel to the engine and allow for stopping same. Supply of fluid under pressure to the control chamber in the starting interlock device 21 will condition same to establish its communication 195 connecting the pipe 322, vented to atmosphere via communication 195 in device 24 and start control pipe 120, to the pipe 258. Thus it will be seen that the fuel is cut off to the engine and a braking force applied to the crank shaft substantially simultaneously to effect stopping of said engine.

With the control handle 103 in "Stop" position, the apparatus will be conditioned as previously described, that is, with the ahead and astern control pipes 11, 12 both charged with fluid under pressure and the start and speed control pipes 120 and 9 both vented to the atmosphere. The maintaining piston 162, valve device 14, and the cam shift piston 141 will remain in their previous positions for operation of the engine in the ahead direction, the brake 15 will be applied, fuel control lever 4 will be in its "Fuel off" position, speed control cylinder device 6 will have its piston in the "Idling speed" position with the speed setting of the governor device 5 thereby so set, the valve device 22 will be set to vent pipe 307' to the atmosphere via its port 309 since lever 4 is in its "Fuel off" position, and the starting air control valve device 20 will be positioned to connect the pipe 303 open to the engine to atmosphere via pipe 198 since its control chamber is vented to atmosphere via the pipe 258.

Now let it be assumed that, with the engine at rest and with the cam shift piston 141 in the position in which it is shown in the drawing providing for ahead operation of the engine, the operator desires to start the engine in the astern direction. To accomplish this, the operator will move the handle 103 to the "Astern" "Start" position in the slot 126 to release fluid under pressure from the ahead control pipe 11 and to supply fluid under pressure to the start control pipe 120, while maintaining the astern control pipe 12 charged with fluid under pressure and the speed control pipe 9 vented to the atmosphere.

When fluid under pressure is vented from the ahead control pipe 11 while the astern control pipe 12 remains charged with fluid under pressure, the piston 162 in cylinder device 13 will move to its astern position opposite to that in which it is shown in the drawing, thus rocking lever 160 to its "Astern" position in which the maintaining valve device 14 is conditioned, as will be obvious from previous description, to effect supply of fluid under pressure to the pipe 159 and venting of fluid under pressure from the pipe 158. With charging of the pipe 159 and venting of the pipe 158, the chambers 142 and 143 in the cam shift cylinder device 10 becomes charged and vented, respectively. The cam shift piston 141 will move from the position in which it is shown in the drawing to its opposite position to shift the engine cam shaft 2 to condition the engine for operation in the astern direction. Just prior to movement of the cam shift piston 141 from its "Ahead" position, both the pipes 333 and 334 will be vented to atmosphere via pipe 158, and upon subsequent movement of said piston, consecutively, the pipe 333 will be opened to the charged chamber 142 while pipe 334 remains open to the vented chamber 143, and finally, substantially at the time that said piston attains its "Astern" position, both pipes 333, 334 are opened to the charged chamber 142.

It will be appreciated, therefore, from previous description, that during movement of piston 141 from its ahead position in which it is shown in the drawing to its opposite astern position, the inverse double check valve device 25 will act to vent the pipe 321, hence the control chamber 175 in the shift interlock device 24, to atmosphere at the time that chamber 143 in the cam shift cylinder device 10 is so vented, and will maintain said pipe and said control chamber so vented until both pipes 333 and 334 are again pressurized, which is when said piston attains its astern position, at which time said inverse double check valve device will cause said pipe and said control chamber to become pressurized.

Thus it will be seen that during the shifting of engine cam shaft 2 to condition the engine for operation in its astern direction, with its control chamber vented, the shift interlock device 24 will maintain its communication 195 disestablished and its communication 196 established so that fluid under pressure in the start control pipe 120 cannot reach the pipe 322 and said pipe 322 will be open to atmosphere. Substantially at the time the cam shaft 2 has attained its "Astern" position, the device 24, in response to supply of fluid under pressure to its control chamber, will establish its communication 195 and thereby connect the now charged start control pipe 120 to the pipe 322.

At the same time that the above occurs and when the ahead control pipe 11 is vented to atmosphere, with the start control pipe 120 and the astern control pipe 12 pressurized, the directional interlock device 18 will remain conditioned connecting the pipe 238 to the still pressurized astern control pipe. The pipe 238 thus will remain pressurized, holding the piston 201 in the fuel cut-off cylinder device 17 positioned to maintain fuel supply to the engine cut-off, and, via double check valve device 23, to maintain the start interlock device 21 conditioned to maintain establishment of its communication 195 connecting the pipe 258 to the pipe 322, which will be vented to atmosphere during shifting of the cam shaft 2 as aforedescribed. While pipe 322 remains vented during such cam shift, the pipe 258 connected thereto as above mentioned will be so vented, so that the brake interlock device 19 will be conditioned by venting of its control chamber via said pipe 258 to connect the still charged pipe 238 to the pipe 300 and hence to the control chamber of the valve device 16. The valve device 16 thus will remain conditioned to maintain the brake cylinder chamber 170 charged with fluid under pressure, and hence the brake applied during the shift of the cam shaft 2 from its ahead to its astern position.

When the cam shaft 2 attains its astern position and the cam shift interlock device 24 then connects the pressurized start control pipe 120 to the pipe 322 as hereinbefore described, fluid under pressure will flow from the former pipe into the latter pipe and thence, via the communication 195 in the start interlock device 21, into the pipe 258 and thereby simultaneously to the chamber 257 in the directional interlock device 18, to the control chamber 175 in the brake interlock device 19 and to the corresponding control chamber in the starting air control valve device 20.

Upon supply of fluid under pressure to chamber 257 in the directional interlock valve device 18, the piston 254 therein is actuated to bring the shoe 261 into engagement with the engine crank shaft 1; in response to supply of fluid under pressure to its control chamber, the brake interlock device 19 will effect venting of fluid under pressure from the control chamber in the valve device 16 which will then respond to release fluid under pressure from the brake cylinder chamber 170 to release the brake 15; and in response to supply of fluid under pressure to its control chamber, the starting air control valve device 20 will establish connection between the supply pipe 153 and the pipe 303 for effecting supply of starting air to the engine. With the brake 15 released, the cam shaft 2 set for operation of the engine in the astern direction, and starting air thus being supplied, said engine will be turned over and the crank shaft 1 will be rotated at a relatively low starting speed in its direction for propelling the ship astern. As soon as the crank shaft 1 starts to turn in its "Astern" direction, the shoe 261 of the directional interlock device 18 in engagement therewith will cause adjustment of the valve mechanism within said device to disestablish connection between the pressurized astern control pipe 12 and the pipe 238 and to establish connection between said pipe 238 and the now vented ahead control pipe 11, which may hereinafter be referred to as the astern setting of said device as will be appreciated from previous description of operation of such device.

With handle 103 remaining in "Astern" "Start" position, with the engine being turned over in its "Astern" direction by starting air, and with the pipe 238 now connected to the vented ahead control pipe 11, fluid under pressure will be released from the chamber 202 in the fuel cut-off cylinder device 17, allowing the piston 201 and rod 204 to withdraw from the fuel control shaft 4 which is then free to assume its "Full fuel" position as urged thereto by action of the spring 44, in the same manner as previously described with regard to starting the engine in its ahead direction. The fly-ball arms 32 in the governor device 5 are not being rotated at sufficient speed while the engine is being turned over on starting air alone to overcome action of the spring 44 to move the fuel control lever 4 out of its "Full fuel" position. With the fuel control shaft 4 in "Full fuel" position the raised portion of the cam 317 will be in engagement with the stem 316 so that the device 22 will be conditioned to maintain the pipe 307', and, via double check valve device 23, the pipe 304 pressurized through connection with the supply pipe 151. Thereby, the start interlock device 21 will remain positioned connecting the pipe 322 to the pipe 258 to maintain the pressurization of the control chamber in the starting air control valve device 20 to thereby maintain supply of starting air to the engine.

With the engine turning over on starting air and fuel being supplied in a maximum amount in accord with the "Full fuel" position of the fuel control lever 4, such fuel will ignite, if the engine be of the diesel type, shortly after its supply to the engine and start said engine to run on fuel. The speed of the engine thus running on fuel will increase above its speed when being turned over on starting air alone. Such increase in speed may be rather rapid and would tend to approach a maximum speed since the fuel control shaft 4 calls for "Full fuel" supply to the engine. The governor device 5, however, being set to maintain idling speed of the engine in accord with the tension of the spring 44, as determined by position of the piston 49 which is in its "Idling position" and in turn the pressure of fluid in the speed control pipe 9 which is at its minimum value corresponding to the "Astern" "Start" position of handle 103, will operate as speed of the engine and hence shaft 1 is thus increasing to move the fuel control shaft 4 from its "Full fuel" position to its "Idling fuel" position to so limit supply of fuel to the engine that a speed greater than its idling speed will not be attained by the engine at this time. In moving from "Full fuel" to "Idling fuel" position, the fuel control lever 4 carries with it the cam 317, which, substantially at the time that said lever attains its "Idling fuel" position will present the recess 319 to the stem 316, thereby allowing the valve 310 in the device 22 to seat and close the supply pipe 151 to the pipe 307' and allowing fluid under pressure from the control chamber in the start interlock device 21 to flow to atmosphere by way of the pipe 304, double check valve device 23, the pipe 307', the unseated valve 315 in said device 22, and the port 309 therein.

With the control chamber in the start interlock device 21 thus vented to the atmosphere, said device will respond to cut off the pipe 322 from the pipe 258 and open the latter pipe to the atmosphere by way of its communication 195 and the pipe 198. With the pipe 258 thus open to the atmosphere, fluid under pressure from the chamber 257 in directional interlock device 18, from the control chamber in the brake interlock device 19, and from the control chamber in the starting air control valve device 20 will be released to the atmosphere.

With fluid under pressure thus vented from its chamber 257, the directional interlock device 18 will retract its shoe 261 away from the engine crank shaft 1 which is rotating in its astern direction and will effect locking of its valve mechanism in an astern position connecting the pipe 238 to the now vented ahead control pipe 11, in which position said valve mechanism will remain until the device is again brought into operation while the shaft 1 is turning in its ahead direction, as will be appreciated from the previous description of the operation of said device 18 per se.

With fluid under pressure vented from its control chamber, the brake interlock device 19 responds to disconnect the pipe 300 from the pipe 301 to atmosphere and to connect said pipe 300 to the pipe 238 which is vented to atmosphere at this time, so that the status of the valve device 16 at this time, will not change, and the brake 15 therefore will remain released.

Upon release of fluid under pressure from its control chamber, the starting air control valve device 20 will respond to disconnect the pipe 303 connected to the engine from the supply pipe 153 and to connect said pipe 303 to atmosphere via communication 196 and the pipe 198. The starting air thus is automatically cut off to the engine which continues to run on the fuel supplied thereto.

With the engine thus running at idling speed and the starting air cut off, the handle 103 may be moved out of "Astern" "Start" in slot 126 to "Astern" "Run and idle" position in the slot 125. From "Astern" "Run and idle" position, the handle 103 may be moved to positions toward or to the "Astern" "Full speed" position, to effect variations in pressure of fluid in the speed control pipe 9 and thereby effect variations in the speed setting of the governor device 5 and regulation of the engine speed accordingly, as will be appreciated from previous description.

As aforedescribed, when the governor device 5 responds to variations in its speed setting above its idling speed setting to move the fuel control lever 4 in a range between "Idling fuel" and "Full fuel" positions to regulate the speed of the engine accordingly, the cam 317 will move with said fuel control lever and present the raised portion 318 of cam 317 to the stem 316 which is thereby displaced inwardly of the casing of the valve device 22. The device 22 thereby will be conditioned to establish pressurization of the pipe 307', and thence, by way of the double check valve device 23 and pipe 304, the control chamber in the interlock device 21. So conditioned, the interlock device 21 will be positioned connecting the pipe 258 to the pipe 322, but the pipe 322 is vented to atmosphere via the device 24 and the start control pipe 120 which is so vented at this time. The status of the pipe 258 does not change at this time therefore, even though the interlock device does connect said pipe 258 to the pipe 322, and the starting air control valve device 20 remains in position connecting the pipe 303 to atmosphere.

It will now be seen that when the operator desires to start the engine into operation in the astern direction after previous operation in its ahead direction, the handle 103 is moved from its "Stop" position to the "Astern" "Start" position. The ahead control pipe 11 is thereby vented to atmosphere with the speed control pipe 9 which remains so vented, while the astern control pipe 12 and the speed control pipe 120 are charged with fluid under pressure. The device 13 responds to venting of the ahead control pipe 11 to condition the valve device 14 to cause operation of the cam shift cylinder device 10 for shifting the engine cam shaft 2 to condition the engine for operation in the astern direction. While the cam shaft 2 is thus being shifted, the inverse double check valve device 25 acts in conjunction with the cam shift cylinder device 10 to maintain the interlock device 24 conditioned to cut off the now charged start control pipe 120 from the pipe 322 and open same to atmosphere until the astern position of said cam shaft is attained, at which time, the device 24 is conditioned to disconnect said pipe 322 from atmosphere and connect it to said start control pipe. Meanwhile, at the same time as the cam shaft 2 is being shifted and while the pipe 322 remains open to atmosphere, the charged astern control pipe 12 is connected to the pipe 238 by way of the directional interlock device 18, which is in its "Ahead" position, so that the fuel cut-off cylinder device will be in its cut-off position holding the fuel control lever 4 in its "Fuel off" position against action of the spring 44, thereby conditioning the device 22, through the action of cam 317 to vent the pipe 307' to atmosphere. Fluid under pressure in pipe 238 also conditions, via double check valve device 23, the device 21 to maintain connection between the pipe 322 and the pipe 258. While the pipe 322 is vented to atmosphere, the pipe 258 is so vented so that the brake interlock device 19 is conditioned to connect the control chamber of the valve device 16 to the charged pipe 238, so that the brake 15 is applied, the starting air control valve device 20 is in its cut-off position, and the directional interlock device 18 is in its inoperative position with its shoe 261 out of engagement with shaft 1. When the start control pipe 120 is connected by the device 24 to the pipe 322 as aforementioned, fluid under pressure flows by way of the device 21 into the pipe 258 to render the directional interlock device 18 operative to sense the direction of rotation of the crank shaft 1, to render the starting air control valve device 20 operative to effect supply of starting air to the engine, and to render the interlock device 19 operative to connect the control chamber in the valve device 16 to atmosphere via pipe 301 so that the brake 15 is released, thus allowing for turning over the engine by starting air. It will be noted, that the interlock device 24 is arranged to prevent supply of starting air to the engine before the cam shaft 2 has assumed its proper position in accord with dictates of the operator's control device 8, as determined by position of the handle 103. When starting air is thus supplied to the engine, the engine turns over in its astern direction. The directional interlock device 18 then responds to rotation of shaft 1 in its astern direction to assume its position connecting the pipe 238 to the now vented ahead control pipe 11, thus allowing release of the fuel cut-off cylinder device 17 so that the fuel control shaft 4 will assume its "Full fuel" position, by action of the spring 44, at the same time causing the device 22, through cam 317, to maintain the device 21, via the double check valve device 23, conditioned to maintain connection between the pipe 322 and the pipe 258. With fuel thus being supplied to the engine by virtue of position of the fuel control shaft 4, same will fire and cause the engine to run thereon. The speed of the engine will tend to increase to a maximum, but the governor device 5, at this time set for idling speed, moves the fuel control shaft 4 to its "Idling fuel" position to limit operation of the engine to such idling speed. In moving to its "Idling fuel" position, the fuel control lever 4 causes the device 22 to be conditioned to vent the pipe 307' to atmosphere, and since the pipe 238 is already so vented at this time, the device 21 is thereby conditioned to vent the pipe 258 to atmosphere, thus automatically causing the directional interlock device to assume its astern rest position and the starting air control valve device 20 to shut off supply of starting air to the engine. The handle 103 is then moved from its "Astern" "Stop" position to "Astern" "Run and idle" whence it may be moved to or toward "Full speed" position for increasing the speed of operation of the engine.

When the operator desires to stop the engine from operation in the astern direction, he will move the handle 103 to "Stop" position for supplying fluid under pressure to the astern control pipe 12 and thus to the fuel cut-off motor 17, by way of the directional interlock device 18 and the pipe 238, to effect cutting off of the fuel supply to the engine through movement of the fuel control lever 4 to its "Fuel off" position. At the same time, fluid under pressure in the pipe 238 will flow via the communication 196 in the brake interlock device 19 to the control chamber in the valve device 16 which will respond to supply of fluid under pressure to the brake cylinder chamber 170 and thereby effect application of the brake 15 for stopping the engine after cut-off of fuel.

The ahead and astern control pipes 11 and 12 will both be charged with fluid under pressure when handle 103 is in "Stop" position. The piston 162 in the cylinder device 13 will remain static, as therefore will the valve device 14, the cam shift piston 141 and the cam shaft 2 which remains in its astern position. The pipes 158, 159 will remain vented and charged, respectively, and the chamber 142 in cylinder device 10 and hence both pipes 333, 334 will remain so charged. With both of the pipes 333, 334 charged, the pipe 321 and hence the control chamber in the interlock device 24 will be so charged. The device 24 is thereby conditioned for connecting the now vented start control pipe 120 to the pipe 322. The pipe 258 will be vented to atmosphere by way of the interlock device 21, the pipe 322 and the start control pipe 120. With the pipe 258 vented, the directional interlock device 18 will therefore remain in its astern rest position, the starting air control valve device 20 will remain in its cut-off position and the brake interlock device 19 will maintain the pipe 300, hence the control chamber in the valve device 16, connected to the now charged pipe 238, so that said device 16 will maintain the brake cylinder chamber 170 charged with fluid under pressure and the brake 15 applied.

Assume now that the engine is operating in the ahead direction, as previously described, with the operator's control handle 103 in a position between "Ahead" "Run and idle" position and "Ahead" "Full Speed" position and that it is desired to effect a reversal in the direction of operation of the engine. The operator will then move the control handle 103 from the position it may be in at the "Ahead" side of "Stop" position directly to the opposite side of "Stop" position and into the slot 126 to the "Astern" "Start" position.

This movement of the handle 103 to the "Astern" "Star" position will cause release of fluid under pressure from the speed control pipe 9 and thereby chamber 50 in the speed control motor 6 to permit adjustment of the tension of the speed control spring 44 to give the idling speed setting of the governor device 5, and will also cause release of fluid under pressure from the ahead control pipe 11 and supply of fluid under pressure to the astern control pipe 12 and to the start control pipe 120. Upon release of fluid under pressure from the ahead control pipe 11 and charging of the astern control pipe 12, the piston 162 will be caused to move to its astern position opposite to that in which it is shown in the drawing, thereby effecting adjustment of the valve device 14 to supply fluid under pressure to the chamber 142 and release of fluid under pressure from the chamber 143 in the cam shift cylinder device 10 whereby the cam shift piston 141 will move to its position opposite to that in which it is shown in the drawing, and in so doing shift the engine cam shaft 2 to its astern position to condition the engine for operation in the astern direction. As aforedescribed, through operation of the inverse double check valve device in cooperation with the cam shift cylinder device 10, the shift interlock device 24 is conditioned to intercept the start control pipe 120 and to hold the pipe 322 open to atmosphere while the cam shift piston 141 is moving from one position to another, and upon attainment of said piston in its astern position, said shift interlock device is conditioned to disconnect the pipe 322 from atmosphere and to connect it to the start control pipe 120.

At the time that the cylinder device 13 is thus set into operation to cause shift of the cam shaft 2 to its astern position and during such shift, fluid under pressure from the charged astern control pipe will flow by way of the directional interlock device 18 to the pipe 238 thence to the control chamber of the start interlock device 21 which responds to connect the pipe 322, vented to atmosphere via the interlock device 24, to the pipe 258, to the chamber 202 in the fuel cut-off cylinder device 17 which moves piston 201 and causes the fuel control lever 4 to be moved to its "Fuel off" position for cutting off supply of fuel to the engine, and to the control chamber of the valve device 16 by way of the communication 196 in the brake interlock device 19, thereby rendering said device 16 responsive to effect supply of fluid under pressure to the brake cylinder chamber 170 to apply the brake 15 for decelerating the engine. The pipe 258, at this time being vented through pipe 322 and communication 196 in the interlock valve device 24, conditions the brake interlock device 19 to allow for connecting the charged pipe 238 to the control chamber of the valve device 16 for applying the brake as above, conditions the starting air control valve device 20 to maintain the starting air cut-off to the engine, and conditions the directional interlock device 18 to remain in its ahead rest position.

At the time of attainment of the cam shaft 2 in its astern position, and as aforementioned, the interlock device 24 responds to connect the charged start control pipe 120 to the pipe 322, whereupon fluid under pressure from said pipe 120 will flow through the pipe 322 and the communication 195 in the interlock device 21 into the pipe 258 to cause the directional interlock device 18 to be brought into its direction sensing operation with its shoe engaging shaft 1; to cause the brake interlock device 19 to disconnect the control chamber in the valve device 16 from the pipe 238 and connect said chamber to atmosphere via the pipe 301, thereby rendering said device 16 operable to effect release of the brake 15; and to cause the starting air control valve device 20 to effect supply of starting air to the engine. If the engine was brought to a complete stop by action of the brake 15, as above described, the starting air thus supplied to the engine will promptly start turning the engine in the astern direction, otherwise the starting air will initially act to bring the engine to a full stop from operation ahead and then start turning it over in its astern direction.

When the engine thus starts to turn over in the astern direction by starting air, the shaft 1 will rotate in its astern direction and the directional interlock device 18 will respond to condition its valve mechanism to disconnect the pipe 238 from the charged astern control pipe 12 and to connect said pipe 238 to the vented ahead control pipe 11. Fluid under pressure will then flow from the chamber 202 in the fuel cut-off cylinder device 22 and will thus allow the fuel control lever 4 to assume its "Full fuel" position under the influence of the spring 44, thereby effecting supply of fuel to the engine, and through positioning of the cam 317, effect adjustment of the device 22 to maintain the control chamber in the start interlock device 21 pressurized by way of the pipe 307' the double check valve device 23 and the pipe 304, with the pipe 238 vented.

With fuel thus being supplied to the engine, such fuel will fire and cause running of the engine in the astern direction at a speed which will be greater than that at which the engine was previously turning over on starting air alone. The governor device 5 will at this time, being set to maintain an idling speed of the engine, effect movement of the fuel control lever 4 out of its "Full fuel" position to its "Idling speed" position to regulate the fuel supply to the engine according to the speed setting of the governor device, as will be appreciated from previous description. Again, as aforedescribed, upon the fuel control lever 4 attaining its "Idling fuel" position, the cam 317 will be so positioned as to present its recess 319 to the stem 316, allowing the spring 312 in the device 22 to close the valve 310, shutting off the pipe 307' from the supply pipe 151, and allowing fluid under pressure from the control chamber in the start interlock device 21 to release to atmosphere by way of the pipe 304, the double check valve device 23, the pipe 307', and, in the device 22, the chamber 307, opening 314, the valve 315, which is unseated by the pressure of such fluid, the chamber 308, and the port 309. It will be appreciated that at this time the pipe 238 connected to one inlet of the double check valve device 23 is also open to atmosphere via the directional interlock device 18, and therefore allows such release of fluid under pressure from the control chamber of the start interlock device 21 to occur.

Upon the release of fluid under pressure from the control chamber in the start interlock device 21 as above described, said device will respond as before to connect, via establishment of its communication 196, the pipe 258 to the pipe 198 and thereby to the atmosphere. With the pipes 258 thus connected to the atmosphere, fluid under pressure will be released from the chamber 257 in the directional interlock device 18 to cause retraction of its shoe 261, from the control chamber in the starting air control valve device 20 which responds thereto to cut off the supply of starting air to the engine, and from the control chamber of the brake interlock device 19 which responds to connect the control chamber of the valve device 16 to the pipe 238 now open to atmosphere, so that the brake 15 remains released.

After the engine is running on fuel and the supply of starting air has thus automatically been cut off, the operator will move the handle 103 from "Astern" "Start" to its "Astern" "Run and idle" position, incidentally venting the start control pipe 120 to atmosphere. To regulate the speed of the engine while running on fuel the operator may then move the handle between "Run and idle" position and "Full speed" as will be appreciated from previous description.

Summarizing, it will now be seen that in reversing the engine from ahead to astern, the apparatus operates in response to movement of the operator's control handle 103 from the "Ahead" side of "Stop" position to the "Astern" "Start" position in the slot 126, to effect shifting of the engine cam shaft 2 from its ahead position to its astern position to condition the engine for operation in its astern direction, and at the same time the fuel is cut off and the brake applied in order that the engine may be brought to a stop. At completion of the cam shafting operation and substantially at the time that the cam shaft 2 attains its astern position, the brake on the crank shaft is released, starting air is admitted to the engine to bring it to a full stop, unless already stopped, and to then start turning same over in its astern direction, and the directional interlock is brought in direction sensing operation. When the engine crank shaft starts to turn in its astern direction, the directional interlock device becomes conditioned to effect release of the fuel cut-off cylinder device 17, allowing the fuel to be supplied to the engine. Shortly after such supply of fuel, same fires and causes running of the engine at an increasing speed above that at which it was being turned over on starting air alone. The speed governor device responds to such increasing speed to effect adjustment in position of the fuel control lever, moving said lever from its "Full fuel" position to its "Idling fuel" position corresponding to the speed setting of the governor device. In movement of the fuel control lever to its "Idling fuel" position means 22, 21 are rendered effective for automatically cutting off the supply of starting air. The engine is then running on fuel and the operator's handle 103 may be moved out of its "Astern" "Start" position to "Astern" "Run and idle" position, venting the start control pipe 120 to atmosphere, and thence to positions to or intermediate the last named position and "Astern" "Full speed" position to regulate the speed of the engine accordingly.

As aforedescribed, when the governor device 5 responds to variations in its speed setting above its idling speed setting to move the fuel control lever 4 in a range between "Idling fuel" and "Full fuel" position to regulate the speed of the engine accordingly, the cam 317 will move with said fuel control lever and present the raised portion 318 of cam 317 to the stem 316 which is thereby displaced inwardly of the casing of the valve device 22. The device 22 thereby will be conditioned to establish pressurization of the pipe 307', and thence, by way of the double check valve device 23 and pipe 304, the control chamber in the interlock device 21. So conditioned, the interlock device 21 will be positioned connecting the pipe 258 to the pipe 322, but the pipe 322 is vented to atmosphere via the device 24 and the start control pipe 120 which is so vented at this time. The status of the pipe 258 does not change at this time therefore, even though the interlock device does connect said pipe 258 to the pipe 322, and the starting air control valve device 20 remains in position connecting the pipe 303 to atmosphere.

With the engine operating in the astern direction as just described, let it be assumed that the operator desires to cause operation of the engine in the ahead direction. To accomplish this he will move the control handle 103 from whatever position it may be occupying at the "Astern" side of "Stop" position to the "Ahead" "Start" position in the slot 127, for effecting release of fluid under pressure from the astern control pipe 12 and from the speed control pipe 9 and for effecting supply of fluid under pressure to the ahead control pipe 11 and to the start control pipe 120.

Since operation of the control apparatus in effecting a "snap" reversal of operation of the engine from its astern to its ahead direction is substantially similar to operation previously described in regard to a reversal in the opposite direction, that is from ahead to astern, detailed description of reversal to ahead will not be given.

Briefly, therefore, in response to supply of fluid under pressure to the ahead control pipe with the engine still running in the astern direction, such fluid under pressure will flow via the directional interlock device 18 to the control chamber of the start interlock device 21 to cause venting of the pipe 258, will flow to the fuel cut-off cylinder device 17 to cause the fuel supply to the engine to be cut off and will flow to the control chamber in the valve device 16 by way of interlock device 19 to cause the brake 15 to be applied. With the fuel supply thus cut off and the brake applied to the crank shaft 1 the engine may be brought to a stop.

At the same time that the above is occurring, in response to supply of fluid under pressure to the ahead control pipe 11 and venting of fluid under pressure from the astern control pipe 12, the piston 162 in the cylinder device 13 will assume its position in which it is shown in the drawing for conditioning the valve device 14 to effect supply of fluid under pressure to the pipe 158 and venting of fluid under pressure from the pipe 159, whereupon the cam shift piston 141 will move to its position in which it is shown in the drawing, carrying the engine cam shaft 2 with it and thereby conditioning the engine for operation in the ahead direction. During movement of the cam shaft, the shift interlock 24 is conditioned to cut off the now charged start control pipe 120 from the pipe 322 and maintain the latter pipe open to atmosphere until said cam shaft attains its ahead position, at which time the shift interlock device 24 is conditioned to connect the start control pipe to the pipe 322. Fluid under pressure will then flow from the pipe 322 into the pipe 258 by way of the start interlock device 21 whence it flows to the control chamber of the brake interlock device 19 to cause release of the brake 15, to the chamber 257 in the directional interlock device 18 to cause shoe 261 to engage the crank shaft 1, and to the control chamber of the starting air control valve device 20 to cause starting air to be supplied to the engine for bringing the engine to a complete stop from astern operation, if necessary, and for then starting it to turn in its ahead direction.

When the engine is thus caused to turn in its ahead direction, the directional interlock device 18 will assume its ahead position connecting the pipe 238 to the now vented astern control pipe 12. Fluid under pressure thus will be released from the chamber 202 in the cut-off cylinder device 17 by way of the pipe 238, allowing the spring 44 to move the fuel control lever 4 to its "Full fuel" position, thereby causing fuel to be supplied to the engine, which fuel thus supplied to the engine will fire and cause running of the engine at increasing speed above that at which same was turning over on starting air alone. At the same time, in assuming its "Full fuel" position, the fuel control lever 4 will cause the device 22 to be conditioned to effect supply of fluid under pressure from the supply pipe 151 to the pipe 307' thence by way of the double check valve device 23 to maintain the control chamber in the start interlock device 21 pressurized to maintain the pipe 258 connected to the pipe 322 at this time.

As the speed of the engine thus increases while being turned over by starting air combined with fuel, the governor device 5 will respond to limit such speed to an idling speed in accord with the speed of setting said device, and will move the fuel control lever 4 from "Full fuel" to "Idling fuel" position, as will be appreciated from previous description. In being caused to assume its "Idling fuel" position, the fuel control lever 4 will carry the cam 317 to its position presenting the recess 319 to the stem 316 of the device 22, allowing said device to cause cut off of the pipe 307' from the supply pipe 151 and venting of said pipe 307' to atmosphere. With the pipe 238 already so vented, the venting of the pipe 307' will cause venting of fluid under pressure from the control chamber of the start interlock device 21, which responds to such venting from its control chamber to disconnect the pipe 258 from the pipe 322 and to connect said pipe 258 to atmosphere by way of the pipe 198.

With the pipe 258 thus vented to atmosphere, fluid under pressure is released from the control chamber in the brake interlock device 19, which responds to connect the pipe 300 to the now vented pipe 238 to allow for subsequent application of the brake 15 when desired, from the chamber 257 in the directional interlock device 18 to allow shoe 261 to be retracted from the shaft 1 while said device maintains its ahead rest position, and from the control chamber in the starting air control valve device 21, which responds to automatically terminate supply of starting air to the engine while same continues to run on fuel supplied thereto.

Speed of the engine may be increased or adjusted as aforedescribed, by moving the handle 103 from "Ahead" "Start" position to and between "Ahead" "Run and idle" and "Ahead" "Full speed" positions.

The start control pipe 120 is again vented to atmosphere to prevent the device 20 from operating to supply starting air to the engine during running of same on fuel.

When it is desired to stop the engine while thus operating in the ahead direction, as before, the handle 103 is moved to "Stop" position, thereby establishing pressurization of both the ahead and astern control pipes 11, 12 and venting of the speed control pipe 9 and of the start control pipe 120 to atmosphere.

With pressure equalized on both sides of the piston 162 in the cylinder device 13, said piston remains static, as therefore does the lever 160 and the cam shift piston 141, which maintains the cam shaft 2 positioned in its ahead position, since in the device 10 chamber 143 remains pressurized and the chamber 142 vented. Both pipes 333 and 334 are therefore charged with fluid under pressure, so that by way of the inverse double check valve device 25, the pipe 321 will also be so charged. With pipe 321 charged, the interlock device 24 will remain positioned connecting the pipe 322 to the now vented start control pipe 120.

At the same time, when the handle 103 is moved to "Stop" and fluid under pressure is supplied to the astern control pipe 12, such fluid under pressure will flow by way of the directional interlock device 18, which is in its previously assumed ahead position, into the pipe 238 to the control chamber of the device 16 by way of the device 19 to cause application of the brake 15, and simultaneously to the chamber 202 in the fuel cut-off cylinder device 200 to cause, through movement of lever 4 to its "Fuel off" position, no cutting off of the supply of fuel to the engine. Fluid under pressure from the pipe 238 also flows at this time via the double check valve device 23 to the control chamber in the start interlock device 21, which responds to maintain the now vented pipe 322 connected to the pipe 258.

With the fuel supply to the engine thus cut off and the brake 15 applied, the engine will come to a stop, as desired and in accord with the position of the handle 103 of the operator's control device 8.

Thus it will be seen that in the embodiment of the invention shown in Fig. 1, I have provided apparatus for controlling the starting, stopping, reversing etc. of such as a reversible diesel engine adapted to be started with starting air and which apparatus, according to a principal feature of the invention, will operate to effect cutting off of the supply of starting air to the engine automatically subsequent to firing of the fuel supplied thereto and without necessitating the operator's participation in effecting such cut-off per se.

According to another feature of the invention embodied in the structure shown in Fig. 1, if, while the engine is operating in either its ahead or astern direction according as whether or not the handle 103 is at the ahead or astern side of its "Stop" position, the pressure of fluid in either the ahead or the astern control pipe should fail, depending upon which had been pressurized, due to leakage of fluid under pressure from the reservoir 63 for example, the maintaining valve device 14 will remain in its previously adjusted position establishing the proper pressure conditions at the opposite sides of the cam shift piston 141 to maintain the engine cam shaft 2 as previously positioned conditioning the engine for operation in the direction in accord with the position of handle 103 before such failure in control pressure may have occurred. Also, at the time of such a failure, both the ahead and the astern control pipes 11 and 12 would be vented to atmosphere and one or the other being connected to the pipe 238 by way of the directional interlock device 18, will maintain said pipe 238 vented, with the brake 15 consequently remaining released and the fuel cut-off cylinder device also remaining so released so that the engine will persist to operate in the same direction as before such failure, it being noted that the source of fluid under pressure for effecting pressurization of the speed control pipe 9 is independent of the source for effecting pressurization of the control pipes 11 and 12.

*Description of the invention embodied in the structure shown in Fig. 4*

The apparatus shown in Fig. 4 comprises essentially the same devices which are shown and described in detail in Fig. 1, but are employed in a somewhat different manner so that should the pressure of fluid supplied to the operator's control device accidentally fail, the engine automatically will be stopped rather than be maintained running as was true of the apparatus shown in Fig. 1. The feature of the automatic cut off of starting air to the engine subsequent to firing of the fuel supplied thereto is embodied in the apparatus shown in Fig. 4, however, as will be pointed out.

Where the devices shown in Fig. 4 are like those shown in Fig. 1 like reference numerals will be employed to designate same and a description and understanding of their operation will be implied, although for such description reference may be made to the above description of the structure shown in Fig. 1.

Briefly, therefore, as shown in Fig. 4, the governor device 5 is associated with the engine crank shaft 1 to adjust position of the fuel control shaft 4 to maintain speed of the engine in accord with the speed setting of said device 5 when the engine is running on fuel. The speed control cylinder device 6 is provided for controlling the speed setting of the governor device 5 in accord with the degree of pressure of fluid in the speed control pipe 9, as was true of the apparatus shown in Fig. 1. The cam shift cylinder device 10, as in the former arrangement, is operatively connected to the engine cam shaft 2 for positioning said shaft in either its ahead or astern positions as before. In the structure shown in Fig. 4, however, the maintaining cylinder device 13 and the valve device 14 have been eliminated. In Fig. 4, operation of the cam shift cylinder device 10 is effected through conditions established in the ahead and astern control pipes 11 and 12 which may have connections with the chambers 143 and 142 in said device 10, respectively. The pipes 333 and 334 are connected as in Fig. 1 to the interior of the cam shift cylinder device 10 and to opposite ends of the inverse double check valve device 25, which, as before, is arranged to control operation of the interlock device 24 via the pipe 321. The device 24 is arranged to operate as before, conditioned to establish its communication 195 while the cam shaft 2 is being shifted from one position to its other position and conditioned to establish its communication 195 when said other position of the shaft 2 is attained. In the device 24, as before, the communication 196 when established connects the pipe 322 to atmosphere via the pipe 198 and the communication 195 when established connects the pipe 322 to the start control pipe 120. The start interlock device 21 is also arranged to establish its communication 195 connecting the pipe 258 to the pipe 322 upon pressurization of the pipe 304 and to establish its communication 196 connecting the pipe 258 to atmosphere via pipe 198 upon venting of the pipe 304. The pipe 304, as before, is connected to the outlet opening of the double check valve device 23. The pipe 258 is connected, as before, to the control chamber of the starting air valve device 20 and to the chamber 257 in the directional interlock device 18. The brake interlock device 19 of Fig. 1 is not employed in the structure shown in Fig. 4 for reasons which should hereinafter become obvious, since such structure as is shown in Fig. 4 will cause the engine to stop upon loss of pressure in the ahead and astern control pipes as will be described subsequently. The starting air control valve device 20 is arranged to operate substantially, as before, to establish its communication 195 connecting the supply pipe 65 (rather than supply pipe 153 of Fig. 1 which is not in the present structure) to the pipe 303 to the engine upon pressurization of the pipe 258, and upon venting of the pipe 258 to establish its communication 196 connecting the pipe 303 to atmosphere via the pipe 198. The directional interlock device 18 also is arranged to operate as before; upon pressurization of the pipe 258 the shoe 261 of said device is brough into engagement with the shaft 1 to sense the direction of rotation of same and to condition its internal valve mechanism accordingly. Upon release of fluid under pressure from the pipe 258, shoe 261 is retracted away from the shaft 1 and the internal valve mechanism locked in an adjusted position in accord with the direction of rotation of the shaft at the time that the shoe was retracted if the shaft was then in rotation, otherwise if the shaft were then stopped said mechanism remains in its last adjusted position, as previously described. When the directional interlock device 18 is adjusted for operation of shaft 1 in its ahead direction the astern control pipe 12 is connected to the pipe 238, and conversely, when adjusted for rotation of shaft 1 in its astern direction, the pipe 238 is connected to the ahead control pipe 11. As was also true before, the device 22 is arranged to be operated by the cam 317, so that when fuel control lever 4 is in its "Full fuel" position said device connects the pipe 307' to a source of fluid under pressure such as the pipe 65, and when said fuel control shaft 4 is caused to assume its "Idling fuel" position said device 22 connects the pipe 307' to atmosphere. The pipe 307' is connected to one inlet of the double check valve device 23 as it was in the structure shown in Fig. 1, and the opposite inlet of the double check valve device 23 is connected to a pipe 390 and thereby to chamber 202 in the fuel cut-off cylinder device 17, and as was not true before, the pipe 390 is also connected directly to the brake cylinder chamber 170 and to an outlet of a double check valve device 400 which has one inlet connected to the pipe 238 from the directional interlock device 18. The opposite inlet of the double check valve device 400 is connected via a pipe 401 to the chamber 179 of a relay valve device 402, which may be similar to the valve device 16 shown in detail in Fig. 1. In the device 402 its chamber 178 is connected to the supply pipe 65, its chamber 180 is connected to a pipe 403 open to atmosphere and its control chamber 175 is connected by way of a pipe 405 to the outlet of a double check valve device 406 which also may be similar to the double check valve device 23. Opposite inlets to the double check valve device 406 are connected to the ahead and astern control pipes 11 and 12, respectively. When either one or the other of the control pipes 11 or 12 is charged with fluid under pressure, the control chamber in the relay valve device 402 will be so charged, and when both of said control pipes are vented to atmosphere, said control chamber will be so vented.

For controlling operation of the apparatus an operator's control device (not shown in Fig. 4) substantially similar to the device 8 in Fig. 1 may be employed. Such a control device need differ from the device 8 in Fig. 1 only in regard to the shape of cams 130 and 131 so that with the handle 103 in "Stop" position both the ahead and astern control pipes 11 and 12 will be vented to atmosphere rather than both being charged with fluid under pressure as in the apparatus shown in Fig. 1, in all other respects, the description of the device 8 will hold and therefore will not be repeated herein. Reference may be made to Figs. 1 and 2 during subsequent description of operation of the apparatus shown in Fig. 4.

In operation of the apparatus shown in Fig. 4, assume that the operator's handle 103 is in its "Stop" position, with the astern, ahead, speed and start control pipes 12, 11, 9 and 120, respectively, vented to atmosphere, that the supply pipe 65 is charged with fluid under pressure, and that the engine is stopped after having been operated in its ahead direction previously.

Chambers 142 and 143 in the cam shift cylinder device 10 thus will both be vented to atmosphere by way of the ahead and astern control pipes 11 and 12, respectively, so that the cam shift piston 141 therein will be in a static condition in the position in which it is shown in Fig. 1, with the cam shaft 2 in its ahead position for conditioning the engine for operation in its ahead direction. Both of the pipes 333 and 334 will be vented to atmosphere by way of the chamber 143 in the cam shift cylinder device 10, so that the control chamber in the shift interlock device 24 will be vented to atmosphere by way of the inverse double check valve device 25 and the astern control pipe 12.

With its control chamber thus vented to atmosphere, the interlock device 24 will be in position establishing its communication 196 connecting the pipe 322 to atmosphere by way of its pipe 198.

At the same time, with both the ahead and astern control pipes 11 and 12, respectively, vented to atmosphere both inlets to the double check valve device 406 will be so vented as consequently will be the pipe 405 and as therefore will be the control chamber in the relay valve device 402. The valve device 402, therefore, is conditioned to establish its communication 196 connecting the charged supply pipe 65 to the pipe 401. The pipe 390, therefore, is charged with fluid under pressure from the pipe 401 by way of the double check valve device 400, as consequently will be one inlet of the double check valve device 23, the brake cylinder chamber 170 and the chamber 202 in the fuel cut-off cylinder device 17 be so charged. The brake 15 therefore will be applied and the fuel cut-off cylinder device 17 will be positioned to hold the fuel control lever 4 in its "Fuel off" position. At the same time, with one inlet to the double check valve device 23 charged with fluid under pressure, the pipe 304, hence the control chamber in the interlock device 21, therefore will be so charged. Thus the device 21 will be positioned establishing its communication 195 connecting the now vented pipe 322 to the pipe 258, so that both the control chamber in the starting air valve device 20 and the chamber 257 in the interlock device 18 will be vented to atmosphere. Under these conditions, the starting air control valve device 20 is positioned establishing its communication 196 connecting the pipe 303 to atmosphere so that at this time there will be no starting air supplied to the engine. With its chamber 257 vented to atmosphere, the shoe 261 of the directional interlock device 18 will be retracted away from the shaft 1 and the valve mechanism comprised in said device will be locked in its last assumed position connecting the pipe 238 to the now vented astern control pipe 12 in accord with the direction in which the engine was last operated, or the ahead direction as assumed. With the fuel control lever 4 in its "Fuel off" position, the cam 317 will be so positioned as to present its recess 319 to the stem 316, so that the device 22 will be conditioned to close off the pipe 307' from the supply pipe 65 and to open said pipe 307' to atmosphere, as will be understood from previous description of the apparatus shown in Fig. 1.

Now let it be assumed that the operator desires to start the engine for operation in the same or ahead direction in which it last operated, as determined by position of the cam shaft 2.

The operator will then move the control handle 103 in the control device 3 from "Stop" position to the "Ahead" "Start" position in the slot 127. This movement of the handle 103 will cause fluid under pressure to be supplied to the ahead control pipe 11 and to the start control pipe 120, while the speed control pipe 9 and the astern control pipe 12 remain vented to the atmosphere.

Fluid under pressure thus supplied to the ahead control pipe 11 will flow simultaneously to the chamber 143 in the cam shift cylinder device 10, to one inlet of the double check valve device 406 and to the directional interlock device 18.

Since the cam shift piston 141 is already in its ahead position same will not move at this time and fluid under pressure supplied to the chamber 143 via the ahead control pipe 11 will flow into both of the pipes 333 and 334 to the inverse double check valve device 25 whence it will flow via said device 25 into and through the pipe 321 to the control chamber in the shift interlock device 24.

Fluid under pressure supplied via the ahead control pipe 11 to the one inlet of the double check valve device 406 will flow by way of said device 406 into and through the pipe 405 to the control chamber in the valve device 402.

Fluid under pressure supplied via the ahead control pipe 11 to the directional interlock device 18 now in its ahead position as assumed, will remain blanked off from the pipe 238 at this time and said pipe will remain connected to the astern control pipe 12 which is vented to atmosphere.

Fluid under pressure supplied as above to the control chamber in the valve device 402 will cause said device to establish its communication 195 connecting the pipe 401 to atmosphere via the pipe 403. In so doing, both inlets to the double check valve device 400 will then be open to atmosphere by way of the pipes 238 and 401, respectively, so that fluid under pressure from the brake cylinder chamber 170, from the chamber 202 in the fuel cut-off cylinder device 17 and from the pipe 304 and hence control chamber in the start interlock device 21 will flow to atmosphere by way of the pipe 390. Thus it will be seen that the brake 15 will release, and the fuel cut-off cylinder device 17 will assume its position allowing the spring 44 of the governor device 5 to move the fuel control lever 4 to its "Full fuel" position, bringing the raised portion 318 of cam 317 into displacing engagement with the stem 316 and thereby conditioning the device 22 to effect supply of fluid under pressure to the pipe 307' and by way of the double check valve device 23 and the pipe 304 to the control chamber in the start interlock device 21 which will respond to establish its communication 195 connecting the pipe 322 to the pipe 258.

At substantially the same time as the above is occurring, fluid under pressure supplied as aforedescribed to the control chamber in the shift interlock device 24 will cause said device to establish its communication 195 connecting the charged start control pipe 120 to the pipe 322. Fluid under pressure from the pipe 322 will flow through the communication 195 in the start interlock device 21 into the pipe 258, whence it will flow to the control chamber in the starting air control valve device 20, to cause starting air from the pipe 65 to be supplied to the engine, and to the chamber 257 in the directional interlock device 18, to cause the shoe 261 to be brought into engagement with the shaft 1 to sense the direction of rotation of same.

With starting air thus being supplied to the engine at this time, and with the fuel control lever 4 in its "Full fuel" position, the starting air will cause the engine to turn over in its ahead direction while fuel is supplied thereto. Since the valve mechanism in the directional interlock device was previously set for operation of the engine in its ahead direction, said valve mechanism will remain so set at this time, connecting the pipe 238 to the vented astern control pipe 12. Shortly after such starting air and fuel are thus supplied to the engine the fuel will fire and cause running of the engine at a speed increasing above that at which it was being turned over on starting air alone. In keeping with one of the principal features of the invention, as the speed of the engine is thus increasing, the speed governor device 5 will respond to cause movement of the fuel control lever 4 from its "Full fuel" position to its "Idling fuel" position to so limit the amount of fuel supplied to the engine that the speed thereof will not exceed its idling speed in accord with the speed setting of said governor device as controlled by the pressure of fluid in the speed control pipe 9, which is now at atmospheric pressure, through the medium of the cylinder device 6 and the spring 44, as will be appreciated from previous description. Again, as in regard to operation of the apparatus shown in Fig. 1, the lever 4, in assuming its "Idling fuel" position will cause the cam 317 to attain the position in which its recess 319 is presented to the stem 316, thereby allowing the valve device 22 to disconnect the pipe 307' from the supply pipe 65 and to connect said pipe 307' to atmosphere. Since at this time the pipe 390 is vented to atmosphere as previously described, fluid under pressure from the control chamber in the start interlock device 21 will release to atmosphere by way of the pipe 304, the double check valve device 23, the pipe 307' and the device 22. Upon venting of its control chamber to atmosphere, the start interlock device 21 will respond to disestablish its communication 195 and to establish its communication 196, thereby disconnecting the pipe 258 from the pipe 322 and connecting said pipe 258 to the pipe 198 and thereby to atmosphere. Upon venting of the pipe 258 to atmosphere, fluid under pressure will flow simultaneously from the chamber 257 in the directional interlock device 18 to allow its shoe 261 to be retracted and its valve mechanism to be locked in its ahead position, and from the control chamber in the starting air control valve device 20, thus conditioning same to disestablish its communication 195 and to establish its communication 196, thereby disconnecting the pipe 303 to the engine from the fluid pressure supply pipe 65 and connecting said pipe 303 to atmosphere via such as the pipe 198. It will be appreciated that during the time that the above is occurring, the handle 103 of the control device 8 has remained in its "Ahead" "Start" position and that the supply of starting air to the engine is cut off automatically substantially at the time that the engine begins to run on fuel and without requiring the attention of the operator to time and effect such cut-off.

With the engine thus running on fuel and the starting air cut off, the operator may then move the control handle 103 from its "Ahead" "Start" position in the slot 127 to its "Ahead" "Run and idle" position in the slot 125, incidentally venting the start control pipe 120 to atmosphere while maintaining the condition of the control pipes 9, 11 and 12 as before in the previous position. The operator may then regulate the speed of the engine running in its ahead direction as he may desire by movement of the handle 103 to or intermediate the "Ahead" "Run and idle" position and the "Ahead" "Full speed" position, in fashion as aforedescribed to control the speed setting of the speed governor device 5 through regulation of pressure of fluid in the speed control pipe 9.

When the operator desires to stop the engine when operating in its ahead direction, he may move the handle 103 to "Stop" position causing fluid under pressure to be vented from the ahead control pipe 11 and from the speed control pipe 9, while the astern and start control pipes 12 and 120 remain so vented.

Upon venting of the ahead control pipe 11 to atmosphere along with the astern control pipe 12, both inlets to the double check valve device 406 will thereby become vented to atmosphere so that fluid under pressure will release from the control chamber of the valve device 402, so that same will respond to disestablish its communication 195 and to establish its communication 196 connecting the pipe 401 to the fluid pressure supply pipe 65. Fluid under pressure will then flow from the pipe 65 by way of the valve device 402, the pipe 401, the double check valve device 406 and the pipe 390 to the chamber 202 in the fuel cut-off cylinder device 17, causing movement of the fuel control shaft 4 to its "Fuel off" position, to the brake cylinder chamber 170, causing an application of the brake 15, and by way of the double check valve device 23 and pipe 304, to the control chamber in the start interlock device 21 which will respond to connect the pipe 322, which will be vented at this time in either position of device 24, to the pipe 258.

The fuel supply thus will be cut off to the engine and the brake applied to bring the engine to a stop. At the same time, while the above is occurring, both of the pipes 333 and 334 will become vented to atmosphere by way of the chamber 143 in the cam shift cylinder device 10 and the ahead control pipe 11.

With the control handle 103 in "Stop" position, the apparatus will be conditioned as previously described, that is with the ahead, astern, speed and start control pipes 11, 12, 9 and 120, respectively, vented to atmosphere. The cam shaft 2 will be in its ahead position, the brake 15 will be applied, fuel control lever 4 will be in its "Fuel off" position, speed control cylinder device 6 will be in its idling speed position with the speed setting of the governor device 5 thereby so set, the valve device 22 will be set, due to position of the fuel control lever 4, to vent the pipe 301' to atmosphere, and the starting air control valve device 20 will be positioned to connect the pipe 303 to the engine to atmosphere via pipe 198 since its control chamber is vented to the atmosphere via the pipe 258.

Now let it be assumed, with the engine at rest and with the cam shaft 2 in its ahead position, in which it is shown in the drawing, to condition the engine for operation in the ahead direction, that the operator desires to start the engine operating in the astern direction. To accomplish this, the operator will move the handle 103 to the "Astern" "Start" position in the slot 126 to effect supply of fluid under pressure to the astern control pipe 12 and to the start control pipe 120, while maintaining the speed control pipe 9 and the ahead control pipe 11 vented to atmosphere.

When fluid under pressure is supplied to the astern control pipe 12, fluid under pressure will flow by way of the double check valve device 406 and the pipe 409 to the control chamber in the valve device 402 and also by way of the directional interlock device 19, the pipe 238 and the double check valve device 400 to pipe 390 and will maintain pipe 390 charged with fluid under pressure as the valve device 402 responds to pressurization of its control chamber to vent the pipe 401 to atmosphere via the pipe 403. At this time, therefore, the fuel remains cut off, the brake 15 remains applied and the interlock device 21 maintains the vented pipe 322 connected to the pipe 258.

At the same time, fluid under pressure supplied to the astern control pipe 12 will flow into the chamber 142 in cam shift cylinder device 10 and will cause movement of the cam shift piston 141 therein from its ahead position to its astern position, thereby effecting a corresponding shift in position of the cam shaft 2 to condition the engine for operation in its astern direction. In moving from its ahead to its astern position the piston 141 will first uncover the pipe 333 to the chamber 142 while the pipe 334 remains open to the chamber 143, and then upon attainment of said piston in its astern position, both pipes 333 and 334 will be open to the chamber 142. While only the pipe 333 is open to the chamber 142 it will be charged with fluid under pressure and when both pipes 333 and 334 are open to said chamber, both will be so charged. From previous description of operation of the inverse double check valve device 25, it will be appreciated that while only the one pipe 333 is charged with fluid under pressure, as during movement of the piston 141, the pipe 321 will remain vented to atmosphere via the pipe 334 and chamber 143 in cylinder device 10, but when both pipes 333 and 334 are so charged, as when the piston 141 attains its astern position, the pipe 321 will also become so charged.

When the pipe 321 becomes charged with fluid under pressure, the shift interlock device 24 will respond to establish its communication 195 to connect the charged start control pipe 120 to the pipe 322, whereupon fluid under pressure will flow from said pipe 120 through the pipe 322, through the communication 195 in start interlock device 21, into and through the pipe 258 to the chamber 257 in the interlock device 18 to bring the shoe 261 into engagement with the shaft 1 and to the control chamber in the starting air control valve device 20 to cause same to establish its communication 195 connecting the supply pipe 65 to the pipe 303 for supplying starting fluid under pressure to the engine while same is conditioned for operation in its astern direction.

It will be appreciated that at this time the fuel is still cut off and the brake 15 yet applied, and if, at the time that the starting air is admitted to the engine as above, the engine is still turning over in its ahead direction, the starting air will aid the brake in effecting stopping of the engine. When such stopping is attained, the starting air will overcome the action of the brake 15 and begin to turn the engine over in its astern direction for which it is conditioned by virtue of the position of the cam shaft 2. Upon initial turning movement of the shaft 1 in its new or astern direction, by engagement of shoe 261 with said shaft, the valve mechanism in the directional interlock device 18 will be caused to move from its previous ahead position to its astern position disconnecting the pipe 238 from the charged astern control pipe 12 and connecting said pipe 238 to the vented ahead control pipe 11.

When the pipe 238 is thus connected to the vented ahead control pipe 11 at the time of initial turning movement of shaft 1 in its astern direction, fluid under pressure will flow via double check valve 400 from the brake cylinder chamber 170 to allow the brake 15 to release and from the chamber 202 in the fuel cut-off cylinder device 17, allowing the spring 44 to move the fuel control lever 4 to its "Full fuel" position, allowing fuel to be supplied to the engine along with the starting air. When the fuel control lever 4 assumes its "Full fuel" position, the raised portion 318 of cam 317 will be in displacing engagement with the stem 316 so that the device 22 will assume its position connecting the pipe 307' to the supply pipe 65 to maintain the control chamber in the start interlock device 21 charged at this time via the double check valve 23 when the pipe 390 is vented to atmosphere, a choke 410 in the branch of the pipe 390 connected to the double check valve device 23 being provided to so limit release of fluid under pressure from said control chamber through pipe 390 that the double check valve 23 will operate in response to supply of fluid under pressure to pipe 307' to open pipe 307' to said chamber before the pressure in said chamber becomes reduced sufficiently to permit movement of the start interlock valve device 21, whereby said device will be maintained in the position opening its communication 195.

With starting air and fuel thus being supplied to the engine and with the brake released, such starting air will cause the engine to turn over in its astern direction at some relatively slow speed below the engine's idling speed. Under this condition the fuel will fire and begin to run the engine in its astern direction at increasing speed above that at which it was turning over on starting air alone.

As before, according to a principal feature of the invention, as the speed of the engine increases above its turn-over speed, the governor device 5 will operate to limit the speed of operation of the engine to its idling speed, in accord with its speed setting, by moving the fuel control lever 4 from its "Full fuel" position to its "Idling fuel" position. When the fuel control lever 4 thus attains its "Idling fuel" position, the recessed portion of the cam 317 will be presented to the stem 316 so that the valve device 22 will operate to disconnect the pipe 307' from the pipe 65 and connect said pipe 307' to atmosphere, thus allowing fluid under pressure from the control chamber in the start interlock device 21 to flow to atmosphere by way of the pipe 304, the double check valve device 23 and said pipe 307', it being realized that at this time the pipe 390 is also vented to atmosphere. When its control chamber is thus vented to atmosphere, the start interlock device 21 will operate to disconnect the pipe 258 from the pipe 322 and to connect said pipe 258 to atmosphere via such as the pipe 198. Upon venting of the pipe 258 to atmosphere, fluid under pressure will flow from the chamber 257 in the directional interlock device 18 and from the control chamber in the starting air control valve device 20. The directional interlock device 18 will then respond to retract its shoe 261 while locking its valve mechanism in the astern position connecting pipe 238 to the ahead control pipe 11. The starting air control valve device 20 will respond to disconnect the pipe 303 from the pipe 65 thereby cutting off supply of starting air to the engine and to connect the pipe 303 to atmosphere via such as the pipe 198.

The operator may then move the handle 103 out of "Astern" "Start" position to "Astern" "Run and Idle" position and regulate the speed of operation of the engine in its astern direction by movement of the handle between or to "Run and idle" and "Full speed" positions in fashion as aforedescribed.

It will thus be seen that in effecting a reversal in the direction of operation of the engine from ahead to astern, that by movement of the handle 103 from a position on the "Ahead" side of "Stop" position to "Astern" "Start" position, automatically, without further movement of said handle, the fuel is cut off to the engine, the brake 15 is applied to stop the engine, the cam shaft 2 is shifted from its ahead to its astern position, and upon attainment of the cam shaft in the latter position, starting air is supplied to the engine to turn same over in its new or astern direction. Upon initial turning movement of the engine in its astern direction, the brake 15 is released and fuel supplied to the engine along with the starting air. When the fuel fires and the engine starts to run on fuel, the starting air is automatically cut off and the handle 103 may then be moved out of its "Astern" "Start" position to its "Astern" "Run and idle" position. The speed of the engine may then be regulated by movement of the handle 103 between "Astern" "Run and idle" and "Astern" "Full speed" positions.

If it is then desired to effect a flash reversal in the direction of operation of the engine from its astern direction back to its ahead direction, same may be effected in manner as above described by movement of the handle 103 from its position on the "Astern" side of "Stop" position to the "Ahead" "Start" position. In so doing, briefly, the fuel supply to the engine will be cut off and the brake 15 applied to bring the engine to a stop. While this is occurring, the cam shaft 2 is shifted from its astern position to its ahead position to condition the engine for operation ahead. Upon attainment of the cam shaft 2 in its ahead position, starting air is supplied to the engine for turning same over in its ahead direction. Upon initial turning over of the engine in its ahead direction, the brake 15 will be released and fuel supplied to the engine along with the starting air. When the engine begins to run on fuel, the starting air is automatically cut off. The handle 103 may then be moved out of "Ahead"

"Start" position to its "Ahead" "Run and idle" position and thence to positions intermedate the last named position and "Ahead" "Full speed" position to regulate the speed of the engine as desired.

If, while the engine is operating in its astern direction, it is desirable to stop same, the handle 103 may be moved to "Stop" position, thereby effecting venting of the control pipes 9, 11, 12 and 120 to atmosphere. In response to this, both sides of the double check valve device 406 will become vented to atmosphere and the valve device 402 will respond to effect supply of fluid under pressure from the pipe 65 to the pipe 401, thence, via the double check valve device 400 and the pipe 399 to the fuel cut-off cylinder device 17, the brake cylinder chamber 170 and to the start interlock device 21 via pipe 394 and the double check valve device 23. In response to this, the cylinder device 17 will operate to cause the fuel supply to be cut off, the brake 15 will apply to stop the engine, and the device 21 operates to connect the pipe 322, which will be vented at this time, to the pipe 25, so that the starting air control valve device 20 will remain conditioned to maintain supply of starting air cut-off and the shoe 231 in the directional interlock device 18 retracted. Both pipes 333 and 334 will become vented to atmosphere by way of the chamber 142 in the cam shift cylinder device 10, so that the control chamber in the shift interlock device 24 will become vented by way of the inverse double check valve device 25. The device 24 will therefore become conditioned to connect the pipe 322 to atmosphere via its communication 196. The piston 141 in the cam shift cylinder device 10 will remain static and in its astern position, as, consequently, will the cam shaft 2 so remain.

If, while the engine is stopped, as above, subsequent to its operation in the astern direction, it is desired to start same running again in the same or astern direction, it may be accomplished in fashion similar to starting the engine for operation ahead after a previous operation ahead as aforedescribed.

Briefly, therefore, the handle 103 may be moved from 'Stop" position to "Astern" "Start" position, charging only the astern control pipe 12 and the start control pipe 120 with fluid under pressure. Fluid under pressure will then flow from the astern control pipe 12 by way of the double check valve device 406 and pipe 405 to the valve device 402 to cause same to vent the pipe 401 to atmosphere. Since, the pipe 238 is also so vented at this time by way of the directional interlock device 18 and the ahead control pipe 11, fluid under pressure will release from the fuel cut-off cylinder device 17 and the brake cylinder 167 to allow the fuel control shaft to assume its "Full fuel" position and brake 15 to be released. Upon attainment of the lever 4 in its "Full fuel" position, the cam 217 will cause, through displacement of stem 316, the device 22 to effect supply of fluid under pressure from the pipe 65 to the pipe 307' to maintain the control chamber in the start interlock device 21 charged with fluid under pressure, so that said device 21 will maintain the pipe 258 connected to the still vented pipe 322. At the same time, with the cam shift piston 141 and the cam shaft 2 already in their astern positions, same will remain static and fluid under pressure from the astern control pipe 12 will flow by way of the chamber 142 in cylinder device 10, the pipes 333 and 334, the inverse double check valve device 25 and the pipe 321 to the control chamber in the shift interlock device 24, causing same to connect the charged start control pipe 120 to the pipe 322. Fluid under pressure will then flow from the start control pipe 120 by way of the device 24, the pipe 322, the device 21, and the pipe 258 to the chamber 257 in the directional interlock device 18 and to the control chamber in the starting air control valve device 20. Since the valve mechanism in the directional interlock device 18 is already in astern position and will remain therein when the engine is started in its astern direction, the effect of supply of fluid under pressure to the chamber 257 will be excluded at this time. The starting air control valve device 20 will respond to supply of fluid under pressure to its control chamber to effect supply of starting air to the engine via the pipe 303. The engine will thus be turned over on starting air simultaneously with supply of fuel thereto. When such fuel fires and engine starts to run on same, the governor device 5 will move the fuel control lever 4 back to its "Idling fuel" position as before to limit the speed of the engine to idling in accord with the idling speed setting of the governor device and the cam 317 again presents its recessed portion 319 to the stem 316, allowing or causing the device 22 to vent the pipe 307' to atmosphere along with the pipe 300 which is also so vented at this time. Fluid under pressure from the control chamber in the start interlock device 21 will now release by way of the pipe 306 and the double check valve device 23, so that the device 21 will respond to connect the pipe 258 to atmosphere. Fluid under pressure from the chamber 257 in the directional interlock device 18 and from the control chamber in the starting air control valve device 20 will now release to atmosphere by way of the pipe 258. The shoe 231 in directional interlock device 18 retracts from the shaft 1 while said device 18 maintains the pipe 238 connected to the vented ahead control pipe 11. The starting air control valve device 20 will respond to cut off the supply of starting air to the engine and to vent the pipe 303 to atmosphere.

The handle 103 may then be moved out of its "Astern" "Start" position to "Astern" "Run and idle" position and thence to positions to or intermediate the last named position and the "Astern" "Full speed" position to regulate the speed of the engine as desired.

While the engine is thus running in its astern direction, same may be stopped as previously described by movement of the handle 103 to its "Stop" position.

It should be pointed out that with the apparatus shown in Fig. 4, if the engine is running in either direction and pressure of fluid in the respective control pipe 11 or 12 should fail, same would be reflected by way of the double check valve device 406 and the pipe 405 to cause the valve device 402 to effect supply of fluid under pressure from the pipe 65 to the pipe 401, hence the pipe 390 by way of the double check valve device 400, and would cause the device 17 to cut off supply of fuel to the engine and the brake 15 to apply, thereby stopping the engine.

Description of Figs. 5, 6 and 7

In Fig. 5 is shown an arrangement whereby the feature of the automatic cut-off of starting air may be employed in conjunction with a speed governor device of the hydraulic type rather than a mechanical speed governor device of the type such as is shown in Figs. 1 and 4. In the use of the mechanical speed governor device (device 5 in Figs. 1 and 4), advantage is taken of the fact that, with same set for a minimum or idling speed well over the speed of rotation of the engine when being turned over on starting air, it will urge the fuel control shaft toward a position calling for a maximum supply of fuel to the engine and, once the engine starts to run on fuel at an increased speed, will move the fuel control shaft back to an idling fuel position. The usual type of hydraulic speed governor device however, employs oil pressure to effect positioning of an actuating element adapted to be connected to the fuel control shaft of the engine under control. Such oil pressure is usually generated by a gear pump or the like comprised in the governor device itself, and is arranged to be driven by the engine through suitable gears or the like coupled to such as the engine crank shaft. When the engine is not running or turning over at relatively slow speed on starting air, for example, the gear pump may not be driven at sufficient rate to generate sufficient oil pressure to move the actuating element and the engine fuel control lever or control rack to or toward its maximum fuel position. For this reason, in order to employ such speed governor device of the hydraulic type in a control system such as is shown in either Fig. 1 or Fig. 4 and incorporate the feature of automatic cut-off of starting air as set forth therein, it becomes necessary to provide means for urging the fuel control lever toward and to its maximum fuel position when the engine is being turned over at a relatively slow rate on starting air alone. Such is the subject matter of Figs. 5 and 6.

Referring now to Fig. 5, a hydraulic speed goveror device 500 is adapted to be employed in either the apparatus shown in Fig. 1 or in the apparatus shown in Fig. 4 in place of the speed governor device 5. The speed control cylinder device 6 may be operatively connected to the hydraulic speed governor device 500 for regulating the speed setting of said device, which in turn is arranged to be driven by such as the engine crank shaft 1 and adapted to adjust the position of the fuel control lever 4 to regulate the speed of the engine according to such speed setting. The cut-off cylinder device 17 is shown arranged to move the fuel control lever 4 to its "Fuel off" position. An extension to the lever 4 has been indicated in the drawing for engagement with the rod 204 of cylinder device 17 which extension is not shown in Figs. 1 and 4 and which is merely a schematic representation. In practice such extension may not be necessary, but rather the device 17 may be arranged in the same manner as in Figs. 1 and 4. As the pressure chamber 202 in the fuel cut-off cylinder device may be connected to either the pipe 238 in the apparatus shown in Fig. 1 or to the pipe 390 in the apparatus shown in Fig. 4, in Fig. 5, such is indicated by the use of both reference numerals. The cam 317 is shown in Fig. 5, having its raised portion 318 and its recess 319 adapted to cooperate with the stem 316 for controlling operation of the device 22 in the same manner as aforedescribed with regard to either the apparatus of Fig. 1 or Fig. 4.

The hydraulic speed governor device 500 may be of a well-known type comprising a gear pump 501 adapted to be driven in either direction by such as the engine crank shaft through suitable gears or the like (not shown) for effecting pressurization of a source passage 502 through discharge of oil from a reservoir of oil 503. A relief valve 504 is provided, loaded by a spring 505, and arranged to allow oil to flow from the passage 502 back into the oil reservoir 503 when the pressure of said oil becomes greater than a certain amount while the gear pump 501 is in operation. A double acting power piston and cylinder arrangement 506 adapted to be operated by pressure of oil from the delivery or source passage 502 is provided for operative connection with the fuel control lever 4 or rack on the engine. Piston and cylinder arrangement 506 may comprise a double acting piston 507 exposed to pressure of fluid in a chamber 508 on one side and to pressure of fluid in an annular chamber 509 on its opposite side. The area of the piston 507 exposed to pressure of fluid in chamber 509 is less than the area exposed to pressure of fluid in the chamber 508. The area of the piston 507 exposed to chamber 509 is limited by a piston element 510 attached for movement with said piston 507. The piston element 510 is slidable within a bore forming with the end thereof a chamber 511 constantly open to atmosphere by way of a port 512. Attached to the piston 507 is an actuating stem or rod 513 for operative connection with the fuel control lever 4 or rack on an engine. The chamber 509 is constantly open to the source passage 502 by way of such as a pipe 514, while the chamber 508 is connected to a delivery chamber 515 by way of a pipe 516. The delivery chamber 515 is arranged for communication with either the source passage 502 to allow for delivery of oil under pressure to the chamber 508, or with the oil reservoir 503 to allow oil in the chamber 508 to be displaced thereto. To control the communication between the delivery chamber 515 and the passage 502 a supply valve 518 is provided, and to control communication between said delivery chamber and the oil reservoir 503, a release valve 519 is provided. Both valves 518 and 519 are connected one with the other by means of a stem 520. The valves 518 and 519 are arranged to be controlled or positioned through the medium of a stem 521 by flyball or weight elements 522 and a speed setting spring 523. The valves 518 and 519 are slidable in a bore 524 in such a manner as to cover and uncover ports 525 and 526 opening the passage 502 to the bore 524 and the bore to the reservoir 503 respectively. To one end of the stem 521 is attached a collar 525'. On the underside of the collar 525', as viewed in the drawing, fingers 526' of the weight elements 522 project into contact with the collar. The weight elements 522 are pivotally connected at 527 to lugs attached to a rotary element such as a bevel gear 528 in such a manner that the weight elements will rotate with the bevel gear and the resultant centrifugal force thereof will cause an upward force to act through the fingers 526' on the underside of the collar 525'. The gear 528 is arranged to be rotated by the engine crank shaft or other rotary part by such as a gear 529 through a shaft 529' and other gears (not shown). One end of the speed control spring 523 is arranged to act downwardly on the collar 525' in such a manner as to oppose the centrifugal action of the weight elements 522 when same are rotated. The opposite end of the speed setting spring 523 is connected to a rod 530 which extends outwardly of the casing for attachment with a positioning element such as the piston rod 53 of the speed control motor 6 through a lever 531 pivotally connected at one end to said rod 530 and at its opposite end to the piston rod 53 of the speed control cylinder device 6. The rod 530 is reciprocable and arranged so that in being displaced inwardly of the casing the spring 523 is urged in the direction of the collar 525', and conversely, in being moved outwardly of the casing will tend to decompress the spring 523 and thereby lower the speed setting of the governor device.

In operation of the hydraulic speed governor device 500, when the engine is running on fuel, the gear pump 501 will displace oil from the reservoir 503 into the passage 502 where such oil will be pressurized to the extent determined by the relief valve 504. Simultaneously the flyball or weight elements 522 will also be driven by the engine rotating with the gear 528. The centrifugal force of the elements 522 acting on the underside of the collar 525' will balance with the force of the speed control spring 523 acting on the upper side of said collar in accord with the compression of said spring and hence speed setting of the governor device. The valves 518 and 519 will be positioned, under the above conditions, to close off the ports 526 and 525 to maintain a certain quantity of oil in the chamber 508 for a certain position of the piston 507 and rod 513 in accord with the speed setting of the governor device. While the engine is running on fuel and the governor device 500 is set to maintain a certain engine speed, when a change in engine load takes place, a momentary change in speed of the engine will take place which will bring about a change in the centrifugal force of the weight elements 522, with the result that said elements will assume a slightly different position until again balanced with the speed control spring 523. As the weight elements thus change their position, they will raise or lower the valves 518 and 519 proportionately, allowing either oil under pressure to flow from the passage 502 to the chamber 508 or oil to flow from said chamber 508 back into the reservoir 503, with the result that the piston 507 will move either in one direction or the other to cause the supply of fuel to the engine to be increased or to be decreased to maintain its speed in accord with the setting of the governor device. It will be seen that when oil is supplied to the chamber 508 at the same pressure as that oil in the chamber 509, there being a greater area of the piston 507 exposed to the oil in chamber 508 than to oil in chamber 509 a differential in force will be created to cause movement of the piston 507 in the direction of said chamber 509, which will be in the direction to cause an increase in supply of fuel to the engine, as will be described subsequently. When the chamber 508 is opened by movement of the valve 519 to the oil reservoir 503, the pressure of oil in the chamber 509 will be rendered effective to move the piston 507 in the direction of said chamber 508 to cause the fuel supply to the engine to be reduced. When the supply of fuel to the engine is thus regulated, same will cause the engine to either increase or decrease in speed and, upon attainment of its original speed in accord with the speed setting of the governor device, equilibrium between the centrifugal force of the weight elements 522 and the force of the spring 523 will again be established. The weight elements 522 will return to their former position and will return the valves 518 and 519 to their closed positions, again locking the oil in the chamber 509 and thereby securing the piston 507 in position fixing the amount of fuel supplied to the engine, which will remain substantially constant so long as the load on the engine does not change.

When the engine is stopped or being turned over slowly on starting air, the compression of the spring 523 will be set to give "Idling speed" of the engine, with little or no opposing centrifugal force from the weight elements 522, so that the spring 523 will be free to urge the valves 518 and 519 to a limit position in which the latter valve will be closed and the former valve will be open, in which positions they are shown in the drawing, with the chamber 508 consequently closed to reservoir 503 and open to passage 502. However, with the engine thus turning over at a slow speed, the pressure of the oil in the passage 502 may be too low to cause the piston 507 to move to its full extent in the direction of chamber 509 to call for a maximum amount of fuel to be supplied to the engine in the manner of the governor device 5 in the structure shown in Figs. 1 and 4, as is required to support the feature of the automatic cut-off of starting air in the apparatus forming the principal subject matter of the present invention.

In order to assure that the fuel control lever 4 will be urged to its "Full fuel" position, as is desired to employ the automatic cut-off of starting air in the present form, a stretchable link 550 is provided for connecting the rod 513 of the governor device 500 to the fuel control lever 4. The link 550 may comprise a rigid spring cage 551 pivotally connected at its one end to the projecting end of the rod 513. A rod 552 may be slidably and guidably mounted within a suitable bore or bores in the cage 551 for pivotal attachment at its one end to the fuel control lever 4. A compression spring 553 is provided, disposed within a longitudinal chamber 554 formed in the cage 551, encircling the rod 552 and interposed between a collar 555 attached to rod 552 and an annular stop element 556 secured to the end of cage 551. The spring 553 urges the collar 555 to a position seated against a shoulder formed in cage 551 and forms a positive connection through which rod 513 of the governor device 500 may move the fuel control shaft 4 in the direction of its "Fuel off" position. The compression of spring 553 is such as will maintain the collar seated during normal control of engine operation by the governor device 500 and therefore will transmit sufficient force between the rod 513 and the rod 552 as to allow said rod 513 to cause movement of the fuel control lever 4 toward and to its "Full fuel" position. However, in whatever position out of "Fuel off" position the shaft 513 of the governor device 500 may carry the fuel control lever 4, the link 550 will allow the fuel cut-off cylinder device 17 to cause movement, through engagement of its rod 204 with the extension of the fuel control lever 4, of said lever 4 to its "Fuel off" position as is done during the operation of the apparatus shown in both Fig. 1 and Fig. 4 and previously described in connection therewith. The link 550 will allow the governor device 500 to determine a position for the fuel control lever 4, and when the fuel cut-off cylinder device 17 is brought into operation, the piston 507, rod 513, and cage 551 may remain substantially fixed while the fuel control lever is moved by said device 17 to its "Fuel off" position, carrying rod 552 with it and further compressing the spring 553. When the fuel cut-off cylinder device 17 is released, the spring 553 will cause return of the rod 552 and fuel control lever 4 back to the position defined by position of the piston 507 in the governor device 500 at which time the collar 555 will reseat on its shoulder in the cage 551. To assure that the governor device 500 will assume a position to call for a "Full fuel" position of the fuel control lever 4 when the engine is turning over on starting air, a cylinder device 560 is provided. Cylinder device 560 may comprise a piston 561 operable upon supply of fluid under pressure to a pipe 562 to cause movement of a piston rod 563 into engagement with an element 564 attached to the rod 513 in such a manner as will cause movement of said rod 513 and piston 507 in the direction of chamber 509 to define a position in which the fuel control lever 4 will be in its "Full fuel" position when the fuel cut-off cylinder device is released. Upon venting of the pipe 562, a return spring 565 in the cylinder device 560 will effect return of the piston 561 and rod 563 to their rest position in which they are shown in the drawing and in which position they will not interfere with control of the fuel control lever 4 by the governor device 500. To control operation of the cylinder device 560, a relay valve device 570 is provided, which may be similar schematically to the starting air control valve device 20 shown and described in detail in connection with apparatus of Fig. 1. For this reason its description will not be repeated and reference may be made to the former Fig. 1 and description in connection therewith. The control chamber 175 in the valve device 570 is connected by means of such as a pipe 571 to the source passage 502 in the governor device 509. The device 570 is operable upon attainment of a certain adequate pressure of oil in the source passage 502 to establish its communication 195 connecting the pipe 562 to atmosphere via such as a pipe 198, and upon a reduction in the pressure of oil in said source passage 502, such as may exist when the engine is turning over slowly on starting air, to establish its communication 196 connecting said pipe 562 to such as the supply pipe 65 to cause the rod 513 to call for "Fuel fuel" position of the fuel control lever 4 as above described.

It will now be seen that, with the arrangement provided in the structure shown in Fig. 5 a hydraulic governor device, such as the device 500, may be employed in the apparatus shown in either Fig. 1 or Fig. 4 in place of the device 5 therein which will maintain the feature of the automatic cut-off of starting air.

*Description of Fig. 6*

The apparatus shown in Fig. 6 is substantially similar to the structure shown in Fig. 5 and discloses a somewhat simpler arrangement for urging the fuel control lever 4 to or toward its "Full fuel" position when the engine is stopped or turning over slowly on starting air so that a hydraulic governor device may be employed in place of the governor device 5 in either the apparatus shown in Fig. 1 or in Fig. 4 and still maintain the feature of automatic cut-off of starting air. In place of the cylinder device 560 and valve device 570 of the structure shown in Fig. 5, a bias tension spring 575 is employed, arranged to constantly urge the piston 507 and rod 513 in the direction to cause the fuel control lever 4 to assume its "Full fuel" position.

One end of tension spring 575 may be connected to the element 564 attached to rod 513, while the opposite end of said spring may be connected to a lug 576 attached to the casing of the governor device 500. The bias tension spring 575 is sufficiently weak as to allow the piston 507 to oppose the effect of same and operate in an otherwise normal manner.

*Description of Fig. 7*

The structure shown in Fig. 7 discloses still another arrangement whereby an hydraulic governor device, of the type which will return its fuel control output shaft to a "Fuel off" position when the engine driving it is stopped, may be employed in the systems shown in Figs. 1 and 4 to insure the feature of automatic cut-off of starting air.

Referring to Fig. 7, the power cylinder 600 of an hydraulic governor device is shown. Such a governor device may be of the well-known type employing a power piston 601 slidably disposed in the power cylinder 600 and attached to a fuel control actuating rod 602 adapted to be connected to the fuel control rack or fuel control lever on an engine. The power piston 601 is usually arranged to be moved in a direction to call for an increase in fuel supply in response to supply of oil under pressure to such as a chamber 603 against opposition of such as a power spring 604. When the engine driving the governor device is operating at or above its idling speed, its gear pump will generate sufficient oil pressure to maintain the power piston 601 positioned in accord with the speed setting of the governor device, the minimum setting of which usually corresponds to an idling speed of the engine. When the speed of the engine reduces below idling speed, such as when same is being stopped, however, due to reducing gear pump speeds, the oil pressure in chamber 603 will reduce down to zero pressure when the engine is no longer running, so that the power piston 601 is moved by spring 604 from its "Idling fuel" position in the direction of chamber 603 to a limit position such as a "Fuel off" position as the engine slows down from its idling speed to a stop. As speed of the engine is increased during starting, up to idling speed, the oil pressure in chamber 603 again increases, causing the piston 601 to move against action of the spring 604 until its "Idling fuel" position is attained, corresponding to idling speed of the engine and the speed setting of the governor device.

To employ a governor device of this type in the control system of Fig. 1 or of Fig. 4, a link 606 is provided to connect the governor fuel control actuating rod 602 to the fuel control lever 4. The link 606 is yieldable longitudinally, it may be lengthened or shortened in length according to whether it is acting as a tension member or a compression member. It may simply comprise a rod 607 pivotally connected at its one end to the fuel control lever 4 and slidably mounted in a suitable bore 608 of a spring cage 609 at its opposite end, the cage 609 being pivotally connected to the governor rod 602. Two spaced apart stop elements 610, 611 are secured to the rod 607 and two washer elements 612, 613, slidably mounted on said rod, are urged toward seating engagement with stop elements 610, 611, respectively, by a compression spring 614 disposed within cage 609 and interposed between said washer elements. With washer elements 612, 613 in contact with stop elements 610, 611 respectively, said washer elements 612, 613 also at the same time substantially contact spaced apart annular shoulders 615, 616, respectively, which are formed in the cage 609. When the cage 609 is sufficiently restrained from movement and a sufficient force exerted against the end of rod 607, said rod may be moved inwardly of said cage, which remains stationary, carrying stop elements 611, 610 and washer element 613 with it, while washer element 612 remains seated on shoulder 615, thereby further compressing the spring 614. When such force thus applied to the end of rod 607 with cage 609 fixed is released, the spring 614 acting on washer element 613, and through said washer element thereby on stop element 611, will cause return of rod 607 to its normal position in which it is shown in the drawing. Conversely, again with cage 609 sufficiently restrained from movement, if a pull sufficient to overcome compression of spring 614 is then exerted on rod 607, said rod will move outwardly of said cage, dragging washer element 612 with it and further compressing said spring. With release of such pull, the rod 607 will again return to its normal position in which it is shown in the drawing, and which may be defined to be that position in which both washer elements 612, 613 are seated on their respective shoulders 615, 616. In normal position of the link 606, the initial compression of the spring 614 holding washer elements 612, 613 seated is sufficient to transmit movement of the governor rod 602 to movement of the fuel control lever 4 when the latter is under control of the former during running of the engine.

In addition, the apparatus further comprises a cylinder device 560 which may be similar to the cylinder device 560 in Fig. 5, previously described. The cylinder device 560 is so arranged as to be operable upon supply of fluid under pressure to the pipe 562 to actuate its rod 563 to move the fuel control lever 4 to its "Full fuel" position, and upon release of fluid under pressure from the pipe 562 to retract its rod 563 to a position which will not interfere with full range movement of fuel control lever 4 between its "Full fuel" and its "Fuel off" position.

To control operation of the cylinder device 560, a valve device 620 is provided which may be similar to device 22 shown in detail in Fig. 1 and described in detail in connection therewith, to which description reference may be made. The chamber 307 in device 620 is connected to the pipe 562, and the chamber 306 therein is connected to the pipe 258, in either the apparatus of Fig. 1 or of Fig. 4. With stem 316 sufficiently depressed inwardly of the casing, the valve device 620 will connect the pipe 562 to the pipe 258, and when the stem 316 is allowed to move outwardly from its sufficiently depressed position, the pipe 562 is disconnected from the pipe 258 and is vented to atmosphere.

To control operation of the valve device 620, hence cylinder device 560, a cam 621 is provided, secured to the governor rod 602 for movement therewith, which is arranged for slidable contact with stem 316 of said device 620. Cam 621 is so shaped and arranged that when power piston 601 is between its "Fuel off" and "Idling fuel" positions, the stem 316 will be in a depressed position conditioning device 620 to maintain connection between pipes 562 and 258, and substantially upon attainment of said piston to its "Idling fuel" position, a recessed portion 622 of cam 621 is presented to stem 316 to allow said device 620 to vent pipe 562 to atmosphere. When piston 601 is positioned in and intermediate its "Full fuel" and "Idling fuel" positions, as during running operation of the engine on fuel, the recessed portion 622 of cam 621 remains presented to stem 316 of device 620.

In operation of the system shown in either Fig. 1 or in Fig. 4 employing the apparatus shown in Fig. 7, when the engine is brought to a stop from running operation, the governor is set for idling speed, while fluid under pressure will be supplied via pipe 238 or 390 to the fuel cut-off cylinder device 17 to cause the fuel control lever 4 to be moved to its "Fuel off" position, in which it is shown in the drawing. At this time the engine slows down and comes to a stop, and the power piston 601 in the hydraulic governor device will be moved by spring 604 to its "Fuel off" position. The link 606 will then be in its normal position, and the cam 621 so positioned as to cause device 620 to hold pipe 562 connected to pipe 258 which is vented in "Stop" position of the operator's control device 8.

When, during starting of the engine, the pipe 258 becomes charged with fluid under pressure to call for supply of starting air to the engine to turn same over at a speed less than idling speed, such fluid under pressure will flow via device 620 to the cylinder device 560 and cause rod 563 to exert a force against fuel control lever 4, urging same toward "Full fuel." The lever 4 will not move out of "Fuel off" position, however, until the fuel cut-off cylinder device 17 is first released, the cylinder device 560 being intentionally of lesser capacity than said device 17. When device 17 is released with device 560 applied, the fuel control lever 4 will be moved to its "Full fuel" position to cause supply of fuel to the engine and at the same time actuating device 22 to cause fluid under pressure to be supplied to pipe 307'. In thus being moved to its "Full fuel" position, the fuel control lever 4 will cause compression of the link 606, while the governor rod 602 and cage 609 of said link remain substantially stationary, the spring 614 in link 606 being weaker than spring 604 in the governor which opposes movement of said cage at this time.

When the engine starts to run on fuel supplied thereto by virtue of position of fuel control lever 4, speed of the engine will start to increase above turn-over speed, causing generation of oil pressure in chamber 603 in the hydraulic governor which pressure will move power piston 601 and rod 602 to "Idling fuel" position corresponding to the minimum speed setting of said governor device. Upon attainment of piston 601 in its "Idling fuel" position, recess 622 in cam 621 is presented to stem 316 of device 620, which responds thereto to vent pipe 562 to release cylinder device 560, allowing the link 606 to assume its normal position and the fuel control lever 4 to move from its "Full fuel" position to its "Idling fuel" position as the hydraulic governor takes control of fuel supply to the engine.

Upon movement of the fuel control lever 4 from its "Full fuel" position to its "Idling fuel" position, the recessed portion 319 of cam 317 is again presented to the stem 316 of device 22 to cause venting of the pipe 307' and automatic cut-off of supply of starting air to the engine as desired, as will be appreciated from previous description.

*Summary*

It will thus be seen that I have provided novel and improved apparatus for remotely controlling the operation of such as a diesel engine, which apparatus includes means for effecting automatic cut-off of the supply of starting air to the engine when same starts to run on fuel.

Having now described my invention, what I claim as new and desire to secure by Letters Patent, is:

1. Apparatus for controlling reversing, starting and operation of a reversible internal combustion engine comprising reversing means for said engine, fuel control means for said engine, starting means for said engine, an operator's control device having forward and reverse positions, means responsive to movement of said control device from either one of said positions to the other to effect operation of said reversing means to condition said engine for operation in the reverse direction and for also effecting operation of said fuel control means to a fuel cut-off position, means responsive to termination of operation of said reversing means to effect operation of said starting means, mechanism responsive to operation of the last named means to detect direction of operation of said engine and operative in response to operation in the direction corresponding to the position of said control device to effect operation of said fuel control means to a fuel supply position, and means responsive to operation of said engine on fuel to terminate operation of said starting means.

2. Apparatus for controlling reversing, starting and operation of a reversible internal combustion engine comprising reversing means for said engine, engine starting means, engine braking means, an operator's control device having forward and reverse positions, means operable by said control device in each of said positions to effect operation of said reversing means to a corresponding position and to also effect operation of said braking means and of said fuel control means to a fuel cut-off position, means operable by said reversing means in each position corresponding to that of said control device to effect operation of said starting means, movement of said fuel control means to a fuel supply position and to render said braking means ineffective, and means responsive to operation of said engine on fuel to terminate operation of said starting means.

3. Apparatus for controlling reversing, starting and operation of a reversible internal combustion engine comprising reversing means for said engine, engine starting means, engine braking means, an operator's control device having forward and reverse positions, means operable by said control device in each of said positions to effect operation of said reversing means to a corresponding position and to also effect operation of said braking means and of said fuel control means to a fuel cut-off position, means operable by said reversing means in each position corresponding to that of said control device to effect operation of said starting means, mechanism responsive to operation of the last named means to detect direction of operation of said engine and responsive to operation in the direction corresponding to the position of said control device to render said braking means ineffective and to effect movement of said fuel control means to a fuel supply position, and means responsive to operation of said engine by fuel to terminate operation of said starting means.

4. Apparatus for controlling reversing, starting and operation of a reversible internal combustion engine comprising reversing means for said engine, engine starting means, engine braking means, an operator's control device having forward and reverse positions, means operable by said control device in each of said positions to effect operation of said reversing means to a corresponding position and to also effect operation of said braking means and of said fuel control means to a fuel cut-off position, means operable by said reversing means position corresponding to that of said control device to effect operation of said starting means, mechanism responsive to operation of the last named means to detect direction of operation of said engine and responsive to operation in the direction corresponding to the position of said control device to effect movement of said fuel control means to a fuel supply position and to render said braking means ineffective, and means responsive to operation of said engine by fuel to terminate operation of said starting means.

5. Apparatus for controlling supply of starting air to an internal combustion engine comprising starting valve means operable by fluid under pressure to supply starting air to said engine and upon release of fluid under pressure to terminate such supply, fuel control means for said engine operable by fluid under pressure to a fuel cut-off position and upon release of fluid under pressure to a fuel supply position, an operator's control device having start and stop positions, and comprising means for supplying fluid under pressure to said fuel control means in said stop position and to said starting valve means in said start position, interlock means controlling fluid pressure supply communication between said operator's control device and said starting valve means, and means operable by said fuel control means in said cut-off position to effect operation of said interlock means to close said communication and in said supply position to effect operation of said interlock means to open said communication.

6. Apparatus for controlling starting air supply to a reversible internal combustion engine comprising a starting air valve device operable by fluid under pressure to supply engine starting air and upon release of fluid under pressure to terminate such supply, engine reversing means, engine fuel control means, an operator's control device operable upon movement from either a forward or a reverse position to the other to effect operation of said reversing means and to supply fluid under pressure to operate said starting air valve device, reversing interlock means for preventing such supply of fluid under pressure to said starting air valve device except with said reversing means conditioned in accordance with the position of said operator's control device, starting interlock means also controlling said supply and operable by fluid under pressure to permit such supply and upon release of fluid under pressure to prevent such supply, fuel control means operable by fluid under pressure to a fuel-off position and upon release of fluid under pressure to a fuel supply position, means responsive to direction of operation of said engine for supplying fluid under pressure to said starting interlock means and fuel control means in response to movement of said operator's control device from either one of its positions to the other and responsive to starting of said engine in the direction corresponding to the position of said operator's control device to release fluid under pressure from said fuel control means, and means operable by said fuel control means in said fuel-off position to supply fluid under pressure to actuate said starting interlock means and in said fuel-on position to release such fluid under pressure.

7. Mechanism for controlling operation of reversing means of a reversible internal combustion engine comprising a fluid motor operable by fluid under pressure in one chamber to move said reversing means to and maintain same in one position and operable by fluid under pressure in another chamber to move said reversing means to and maintain same in another position, a source of fluid under pressure, reversing valve means including an operating lever selectively operable to different positions for operating said valve means to respectively open one or the other of said chambers to said source while at the same time opening to atmosphere the chamber not connected to said source, another fluid motor operative independently of the first named motor for moving said lever to its different positions, toggle means operative in each of said positions of said lever for biasing same against movement therefrom by said other motor, and an operator's control device for controlling supply and release of fluid under pressure to and from said other fluid motor for actuating same.

8. Apparatus for controlling the starting of an engine adapted to be turned over at a certain speed by means of starting air supplied thereto and to run at a speed above said certain speed on fuel supplied thereto, comprising starting air control means to effect supply and termination of supply of said starting air to said engine, fuel control means operable to regulate the amount of fuel supplied to said engine, engine speed responsive means operatively connected to said fuel control means to control the amount of fuel supply to the engine according to speed of its operation, and means responsive to said speed responsive means and operatively connected to said starting air control means to effect said termination when the speed of operation of the engine exceeds said certain speed.

9. Apparatus for controlling the starting of an engine adapted to be turned over at a certain speed by means of starting air supplied thereto and to run at speeds above said certain speed by combustion of fuel supplied thereto, comprising starting air control means operable to effect supply and termination of supply of said starting air to said engine, fuel control means movable to a first position to effect supply of a certain first amount of fuel to said engine and to a second position to effect supply to said engine of a certain second and less amount of fuel, engine speed responsive means operably connected to said engine and operatively connected to said fuel control means, said speed responsive means being adapted to move said fuel control means to its said one position when the engine is turning over at said certain speed and to move said fuel control means to its said other position when the engine starts to run on fuel, means operable to operate said starting air control means to effect said supply, and means responsive to said fuel control means upon attaining said second position to operate said starting air control means to effect said termination.

10. Apparatus for controlling the starting of a reversible engine adapted to be turned over in one direction or another, according to position of a shiftable cam shaft, at a certain speed on starting air supplied thereto and at speeds above said certain speed on fuel supplied thereto, comprising starting air control means operable to effect supply of said starting air to said engine, fuel control means movable to positions to and between upper and lower limit positions corresponding to maximum fuel and fuel cut-off, respectively, to regulate supply of fuel to the engine accordingly, governor means responsive to the speed of operation of the engine and operable to urge said fuel control means toward its upper limit position when the engine is turning over at said certain speed and to move said fuel control means to a position intermediate said limit positions when the engine starts to run on fuel at a speed above said certain speed, fuel cut-off means operable to overcome action of said governor means and move said fuel control means to its lower limit position, manually operable control means operable to effect operation of said fuel cut-off means and said starting air control means, directional interlock means sensitive to direction of operation of the engine to effect termination of operation of said fuel cut-off means when the engine starts to turn over in its proper direction, and means operable by said fuel control means upon attainment of its intermediate position to effect termination of operation of said starting air control means when the engine starts to run on fuel.

11. Apparatus for controlling the starting of a reversible engine adapted to be turned over at a certain speed on starting air supplied thereto and to be run at speeds above said certain speed on fuel supplied thereto in either of two directions according to one position or another position of a shiftable cam shaft, comprising starting air control means operable to effect supply of starting air to the engine, fuel control means movable to and between lower and upper limit positions corresponding to fuel cut-off and full fuel supply, respectively, to regulate supply of fuel to the engine accordingly, governor means responsive to the speed of the engine and operable to urge said fuel control means toward its upper limit position when the engine is turning over at said certain speed and to move said fuel control means to a position intermediate said limit positions when the engine starts to run on fuel, fuel cut-off means operable to overcome action of said governor means and move said fuel control means to its lower limit position, cam shift means operable to shift said cam shaft to its said one position or to its said other position, manually operable control means operable to effect operation of said cam shift means and said fuel cut-off means, shift interlock means operative in response to completion of operation of said cam shift means to effect operation of said starting air control means, directional interlock means sensitive to direction of operation of the engine to effect termination of operation of said fuel cut-off means when the engine turns over in the direction in accord with the position of said cam shaft, and means operable by said fuel control means upon attainment of its intermediate position to effect termination of operation of said starting air control means when the engine starts to run on fuel.

12. Apparatus for controlling the starting of a reversible engine adapted to be turned over at a certain speed on starting air supplied thereto and to be run at speeds above said certain speed on fuel supplied thereto in either one direction or an opposite direction according to one position or an opposite position of a shiftable cam shaft, comprising starting air control means operable to effect supply of said starting air to said engine, fuel control means movable to and between a lower limit position and an upper limit position corresponding to fuel cut-off and to full fuel supply, respectively, to regulate supply of fuel to the engine accordingly, governor means responsive to the speed of the engine and operable to urge said fuel control means toward its upper limit position when the engine is turning over at said certain speed and to move said fuel control means to a position intermediate said upper limit position and said lower limit position when said engine starts to run on fuel at speeds above said certain speed, fuel cut-off means operable to overcome action of said governor means on said fuel control means and move said fuel control means to its said lower limit position, cam shift means operable to one position to shift said cam shaft to its said one position and to an opposite position to shift said cam shaft to its said opposite position, manually operable control means operable to one position or to an opposite position to effect operation of said cam shift means to its one position or to its opposite position, respectively, and to effect operation of said fuel cut-off means and said starting air control means, shift interlock means operable to prevent operation of said starting air control means during operation of said cam shift means and until attainment of said cam shift means in either its one position or its opposite position, directional interlock means sensitive to direction of turning over of the engine to effect termination of operation of said fuel cut-off means when the engine turns over in accord with position of said cam shaft, and means operable in response to movement of said fuel control means from its upper limit position to its intermediate position to effect termination of operation of said starting air control means.

13. Apparatus for controlling the starting of a reversible engine adapted to be turned over at a certain speed on starting air supplied thereto and to be run on fuel at speeds above said certain speed according to one position or another position of a shiftable cam shaft, comprising starting air control means operable to effect supply of starting air to said engine, fuel control means movable to and between a lower limit position and an upper limit position corresponding to full fuel supply and no fuel supply to the engine, respectively, governor means responsive to the speed of the engine and adapted to urge said fuel control means toward its upper limit position when the engine is turning over at said certain speed and to move said fuel control means to a position intermediate said upper limit position and said lower limit position when said engine starts to run on fuel at speeds above said certain speed, fuel cut-off means operable to move said fuel control means to its lower limit position, manually operable control means operable to effect operation of said starting air control means and said fuel cut-off means, start interlock means operable in response to termination of an imposed condition to render said starting air control means non-operable by said manually operable control means and to maintenance of said imposed condition to render said starting air control means operable by said manually operable control means, directional interlock means operable to terminate said imposed condition and to terminate operation of said fuel cut-off means when the engine turns over in the direction in accord with position of said cam shaft, and means operable when said fuel control means is in its upper limit position to maintain said imposed condition and responsive to subsequent movement thereof to its intermediate position to terminate said condition.

14. Apparatus for controlling the starting of an engine adapted to be turned over at a certain speed by means of starting air supplied thereto and to run at an idling speed above said certain speed by combustion of fuel supplied thereto, comprising starting air control means operable to effect supply and termination of supply of said starting air to said engine, a fuel control lever movable to a first position to effect supply of a certain first amount of fuel to said engine and to a second position to effect supply of a certain second and less amount of fuel to said engine for idling operation of same, hydraulic speed governor means operable by said engine and operatively connected to said fuel control lever to effect movement of same by employment of a hydraulic fluid at a certain hydraulic pressure generated through operation of the engine at speeds above said certain speed, said speed governor means being operable to move said fuel control lever to its second position when the engine is operating on fuel at its idling speed, means operable to urge said fuel control lever to its first position when said hydraulic fluid is less than said certain hydraulic pressure and inoperable when said certain hydraulic pressure is established, means operable to operate said starting air control means to effect supply of starting air to said engine, and means responsive to said fuel control lever upon attaining its second position to operate said starting air control means to effect said termination of supply of starting air to said engine.

15. Apparatus for controlling the starting of an engine adapted to be turned over at a certain speed by means of starting air supplied thereto and to run at an idling speed above said certain speed by combustion of fuel supplied thereto, comprising starting air control means operable to effect supply and termination of supply of said starting air to said engine, a fuel control lever movable to a first position to effect supply of a certain first amount of fuel to said engine and to a second position to effect supply of a certain second amount of fuel to said engine for idling operation of same, said second amount being less than said first amount, hydraulic speed governor means operable by said engine and operatively connected to said fuel control lever to effect movement of same by employment of an hydraulic fluid at a certain hydraulic pressure generated through operation of the engine at speeds above said certain speed, said speed governor means being operable to move said fuel control lever to its second position when the engine is operating on fuel at its idling speed, bias spring means arranged to urge said fuel control lever toward its first position, means operable to operate said starting air control means to effect supply of starting air to said engine, and means responsive to said fuel control lever upon attaining its second position to operate said starting air control means to effect said termination of supply of starting air to said engine.

16. Apparatus for controlling the starting of a reversible engine adapted to be turned over in one direction or another according to position of a shiftable cam shaft at a certain speed on starting air supplied thereto and to run at speeds above said certain speed on fuel supplied thereto, comprising starting air control means operable to effect supply of said starting air to said engine, fuel control means movable to positions to and between upper and lower limit positions corresponding to maximum fuel and fuel cut-off, respectively, to regulate supply of fuel to the engine accordingly, hydraulic speed governor means operable by said engine and operatively connected to said fuel control means to effect movement of same by employment of a hydraulic fluid at a certain hydraulic pressure generated through operation of the engine at speeds above said certain speed, said speed governor means being operable to move said fuel control means to a position intermediate said upper and lower limit positions when the engine starts to run on fuel at speeds above said certain speed, means operable to urge said fuel control means toward its upper limit position when said hydraulic fluid is less than said certain hydraulic pressure and inoperable when said certain hydraulic pressure is established, fuel cut-off means operable to move said fuel control means to its lower limit position, manually operable control means operable to effect operation of said fuel cut-off means and said starting air control means, directional interlock means sensitive to direction of operation of the engine to effect termination of operation of said fuel cut-off means when the engine is turning over in the direction in accord with position of said cam shaft, and means operable by said fuel control means upon attainment of its intermediate position to effect termination of operation of said starting air control means when the engine starts to run on fuel.

17. Apparatus for controlling the starting of a reversible engine adapted to be turned over in one direction or another according to position of a shiftable cam shaft at a certain speed on starting air supplied thereto and to run at speeds above said certain speed on fuel supplied thereto, comprising starting air control means operable to effect supply of said starting air to said engine, fuel control means movable to positions to and between upper and lower limit positions corresponding to maximum fuel and fuel cut-off, respectively, to regulate supply of fuel to the engine accordingly, hydraulic speed governor means operable by said engine and operatively connected to said fuel control means to effect movement of same by employment of a hydraulic fluid at a certain hydraulic pressure generated through operation of the engine at speeds above said certain speed, said speed governor means being operable to move said fuel control means to a position intermediate said upper and lower limit positions when the engine starts to run on fuel at speeds above said certain speed, bias spring means arranged to urge said fuel control means toward its upper limit position, fuel cut-off means operable to move said fuel control means to its lower limit position, manually operable control means operable to effect operation of said fuel cut-off means and said starting air control means, directional interlock means sensitive to direction of operation of the engine to effect termination of operation of said fuel cut-off means when the engine is turning over in the direction in accord with position of said cam shaft, and means operable by said fuel control means upon attainment of its intermediate position to effect termination of operation of said starting air control means when the engine starts to run on fuel.

18. Apparatus for controlling the starting of an engine adapted to be turned over at a certain speed on starting air supplied thereto and to run at an idling speed above said certain speed on fuel supplied thereto, comprising starting air control means operable in response to exposure to a certain condition to effect supply of said starting air to said engine, fuel control means movable to a first position to call for supply of a maximum amount of fuel to the engine and to a second position to call for supply of an amount of fuel to said engine less than said maximum amount to run said engine at idling speed, governor means sensitive to speed of turnover of the engine and adapted to move said fuel control means to its first position when the engine is turning over at said certain speed and to move said fuel control means to its second position when the engine starts to run on fuel at speeds above said certain speed, manually operable means operable to one position to establish said certain condition and to another position to disestablish said certain condition, and means operable when said fuel control means attains its second position to terminate exposure of said starting air control means to said certain condition.

ROY R. STEVENS.

REFERENCES CITED

The following references are of record in the file of this patent:

UNITED STATES PATENTS

| Number | Name | Date |
|---|---|---|
| 1,197,371 | Herr | Sept. 5, 1916 |
| 1,925,003 | Renner | Aug. 29, 1933 |
| 1,925,057 | Price | Aug. 29, 1933 |
| 2,069,587 | Mattern | Feb. 2, 1937 |
| 2,243,883 | Ramstad | June 3, 1941 |
| 2,395,202 | Stevens | Feb. 19, 1946 |
| 2,438,427 | Whitney | Mar. 23, 1948 |
| 2,444,273 | Stevens | June 29, 1948 |